United States Patent [19]
Thompson

[11] 3,897,189
[45] July 29, 1975

[54] APPARATUS FOR FORMING TOROIDS
[75] Inventor: Daniel T. Thompson, Pacific Palisades, Calif.
[73] Assignee: Thompson Bagel Machine Manufacturing Corporation, Los Angeles, Calif.
[22] Filed: Jan. 10, 1974
[21] Appl. No.: 432,302

[52] U.S. Cl............ 425/324 R; 425/364 B; 425/374
[51] Int. Cl.............................................. A21c 3/00
[58] Field of Search ........ 425/324 R, 364 R, 364 B, 425/374, 329, 223, 324, 364

[56] References Cited
UNITED STATES PATENTS

| | | | |
|---|---|---|---|
| 590,133 | 9/1897 | Corby | 425/364 X |
| 1,163,626 | 12/1915 | Allison | 425/374 X |
| 1,275,530 | 8/1918 | Clark | 425/374 X |
| 1,542,833 | 6/1925 | Parsons et al. | 425/374 X |
| 1,803,991 | 5/1931 | Bainbridge | 425/329 |
| 2,584,514 | 2/1952 | Thompson et al. | 425/324 |

Primary Examiner—Francis S. Husar
Assistant Examiner—David S. Safran

[57] ABSTRACT

Apparatus for forming individual batches of dough into toroids including means for preforming the batches of dough into generally cylindrical strips of predetermined length and diameter and feeding the preformed strips one at a time to a strip transport and feed means whereby the strips are conveyed one at a time and at a predetermined rate to a feeding station where the strips are picked up and formed into toroids, the strips being conveyed to the feeding station at a rate related to the toroid formation thereof.

21 Claims, 18 Drawing Figures

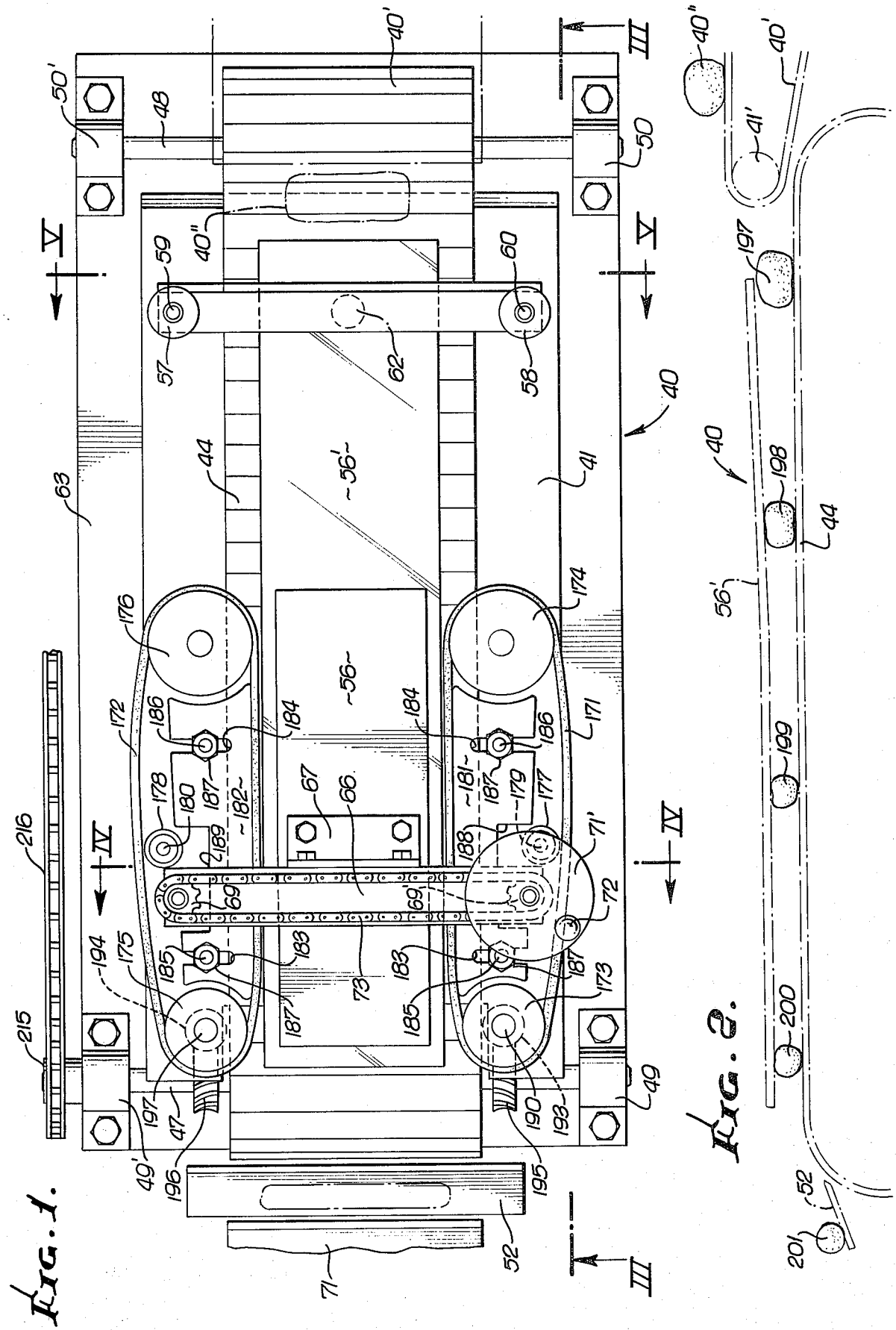

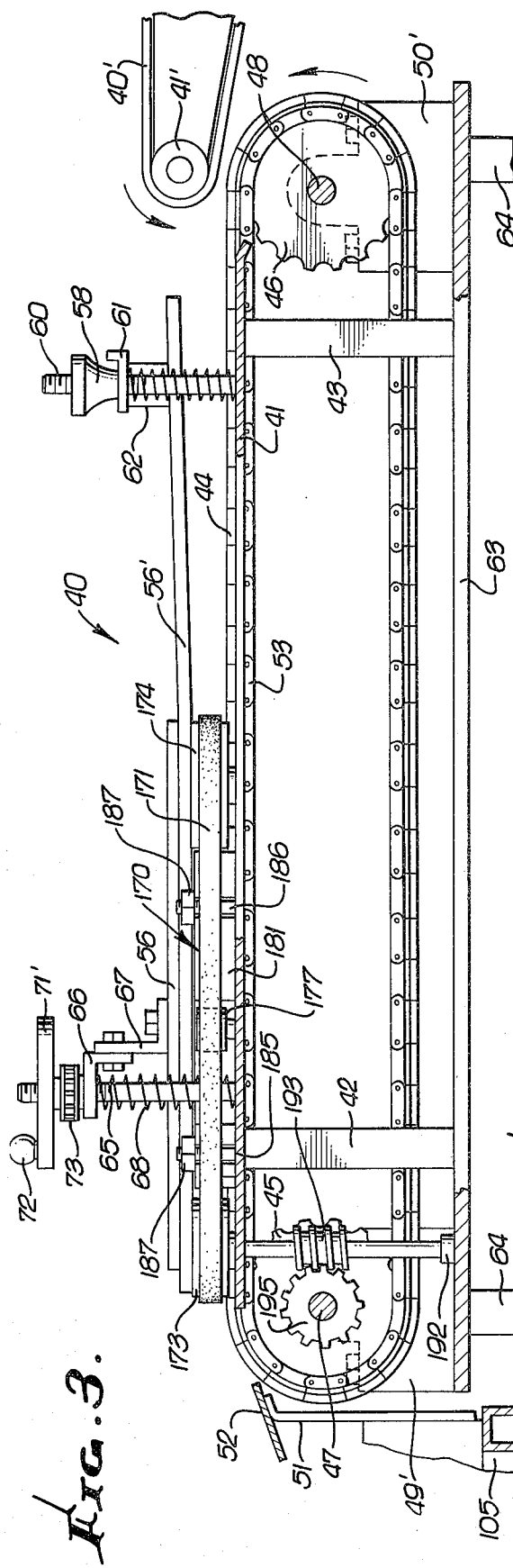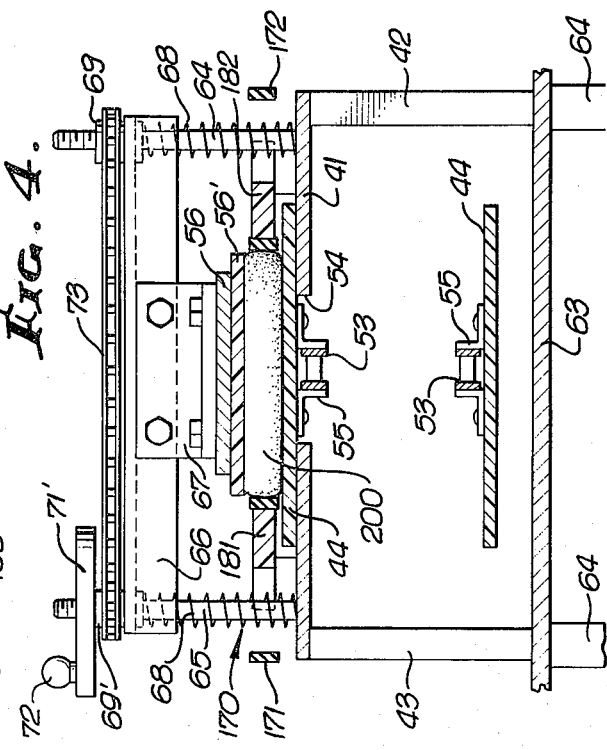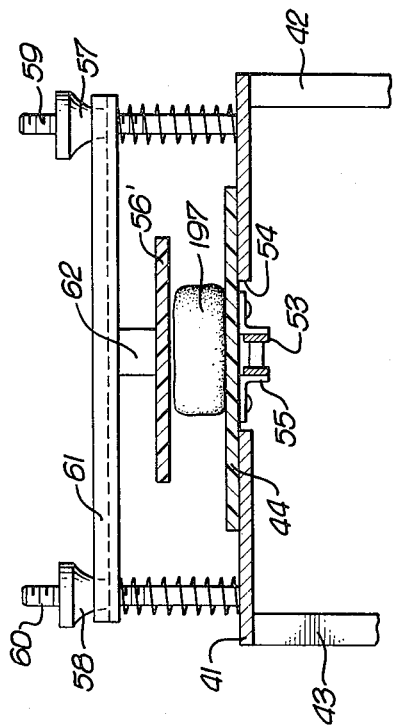

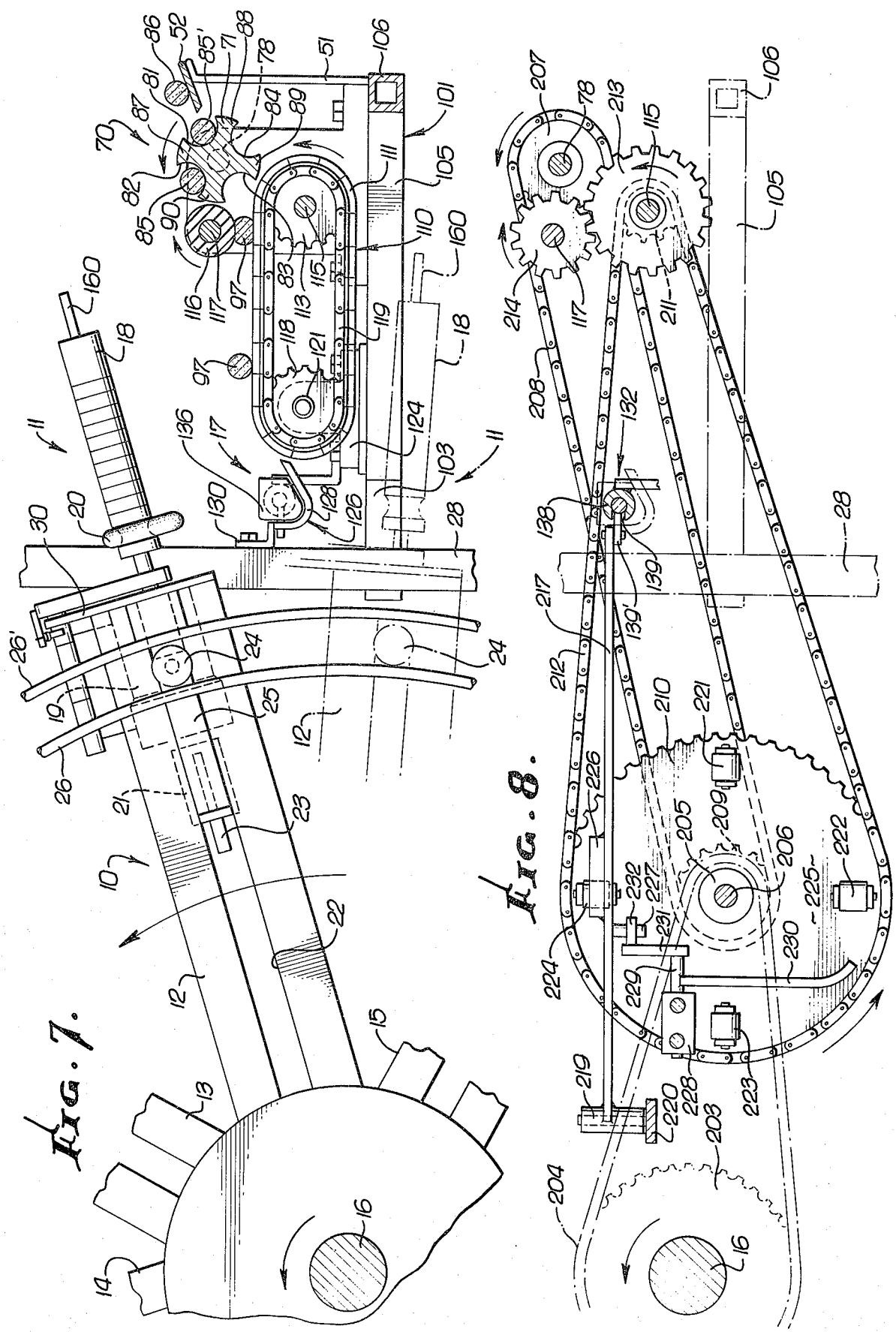

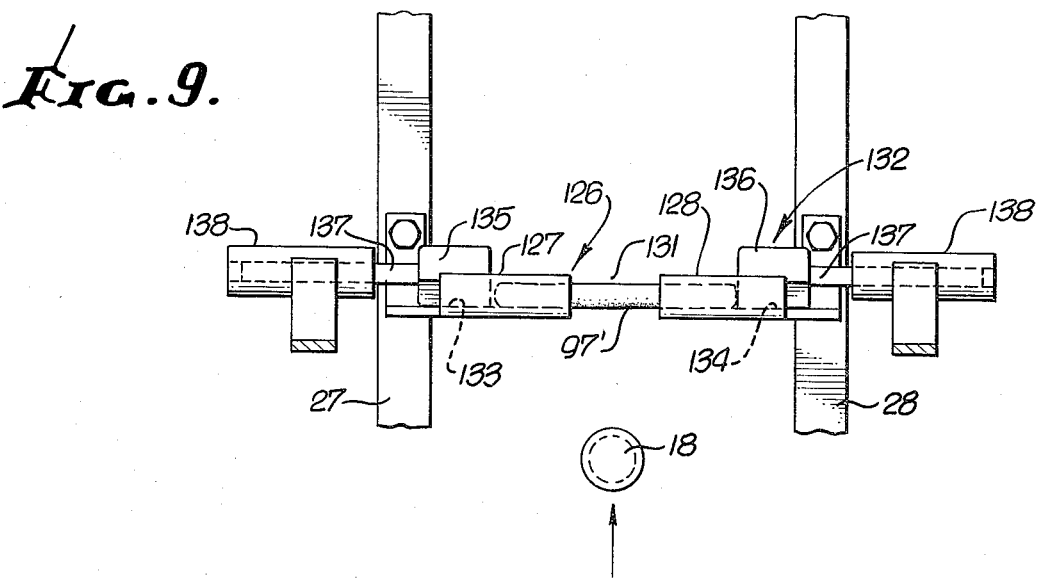
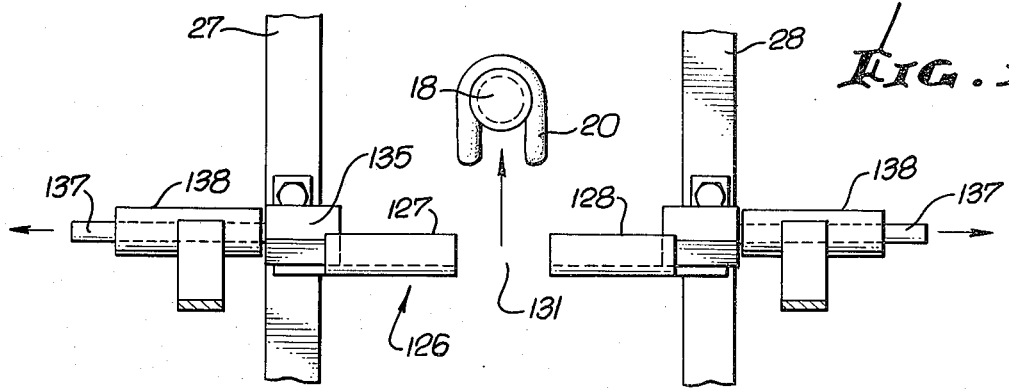
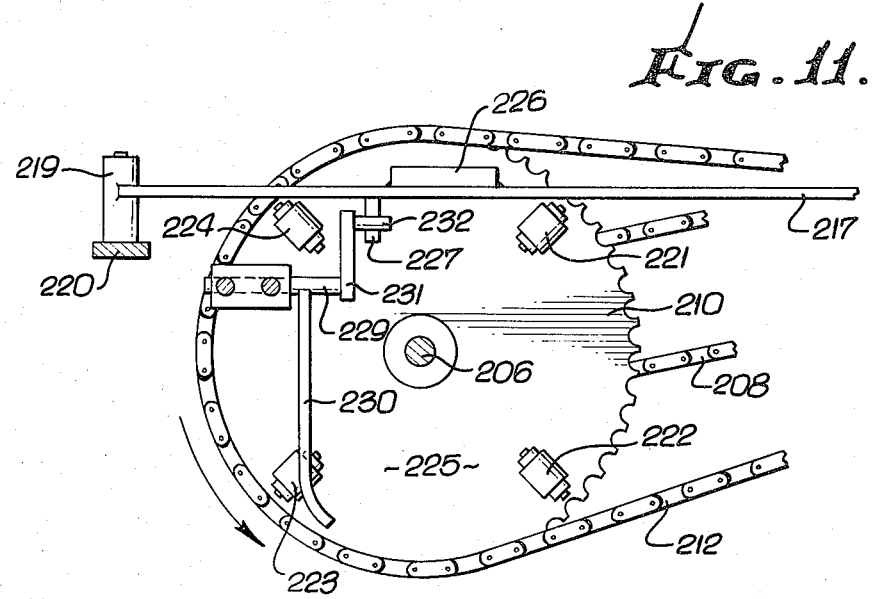

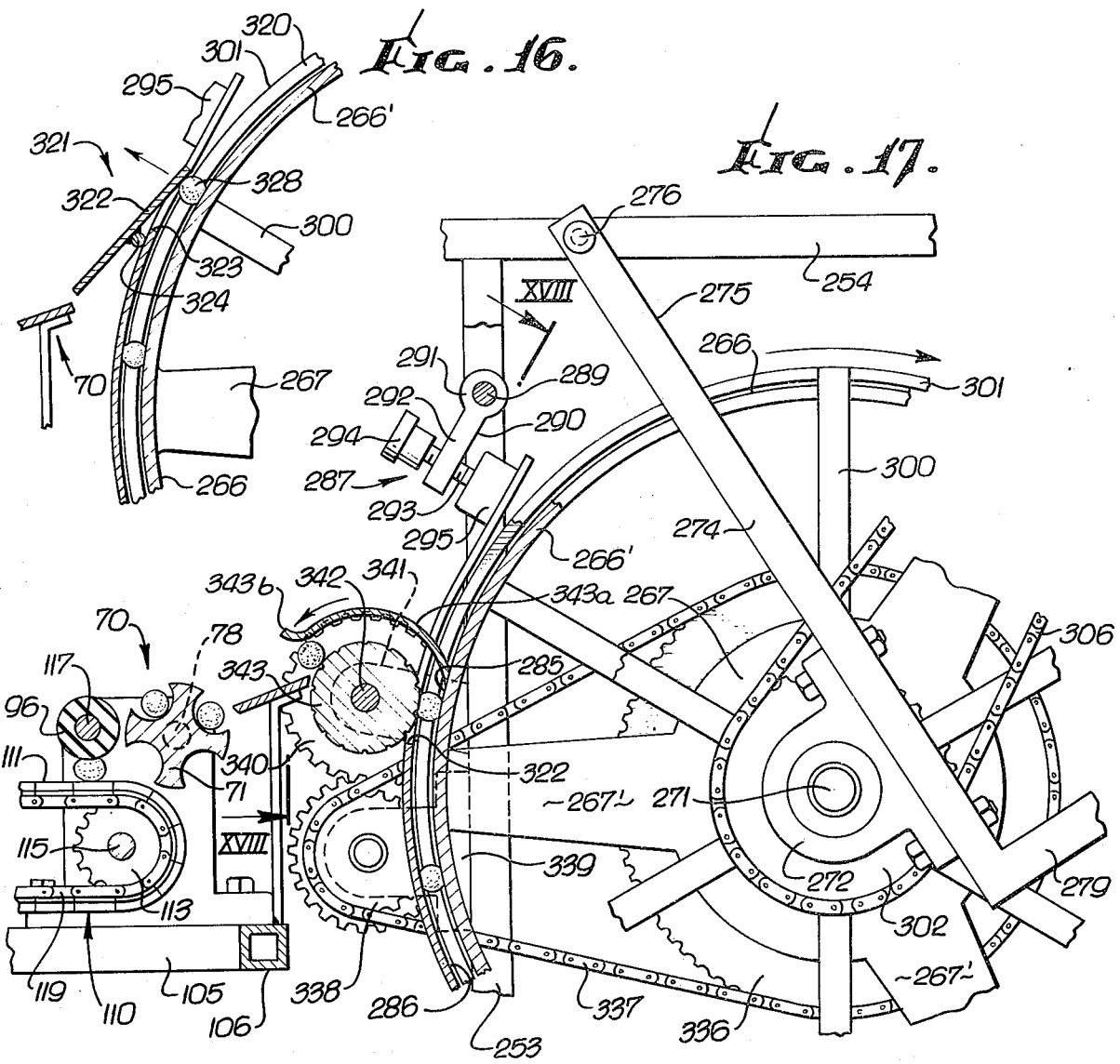
FIG. 16.
FIG. 17.
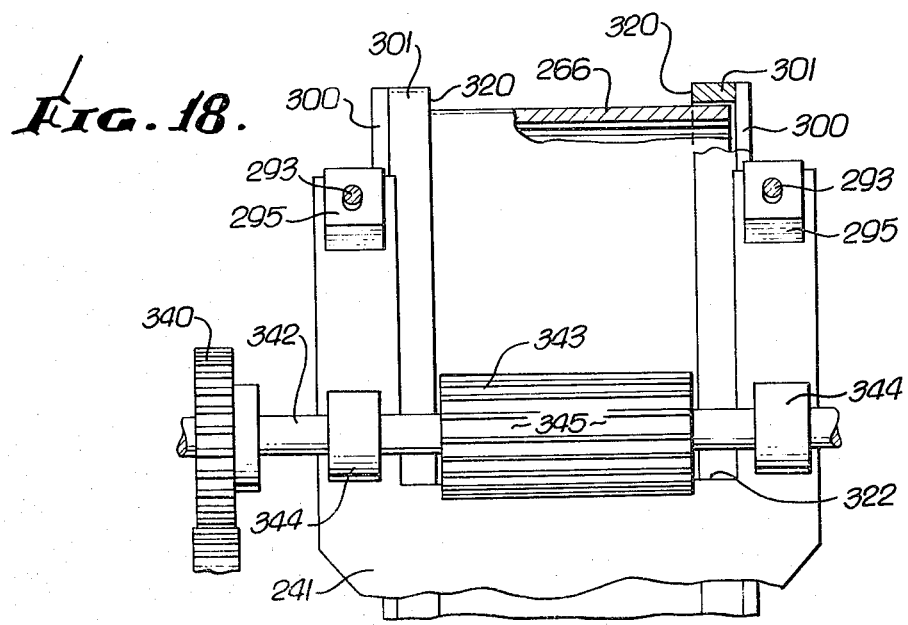
FIG. 18.

APPARATUS FOR FORMING TOROIDS

BACKGROUND OF THE INVENTION

1. Field of the Invention

The invention relates to apparatus for forming toroids from batches of dough; and, more particularly, to apparatus for rolling batches of dough into strips of desired length and diameter and feeding such strips into apparatus wherein such strips are formed into toroids.

2. Description of the prior Art

In the "Apparatus for Making a Toroid" disclosed in U.S. Pat. No. 3,371,624, a plurality of dough forming assemblies, including relatively movable mandrel and sleeve means, were mounted for more or less vertical rotation upon support arms about a central generally horizontal axis, somewhat like a Ferris wheel, with individual strip-like dough bodies being picked up by the mandrel of each forming assembly as it is rotated through a dough feeding station. During the revolving movement of the assembly about a central axis, the mandrel is moved relative to its associated sleeve to form the strip of dough into a toroid and discharge it prior to completing a rotating motion back into a position where the mandrel is ready to pick up a next successive strip of dough in the feed station. While other forms of dough can be formed in the aforementioned toroid forming apparatus, the apparatus of my aforementioned patent is primarily intended for use in forming bagels from a fairly tough, elastic and tacky dough as more fully explained in that patent.

Heretofore, and as illustrated in the drawings of my aforementioned U.S. Pat. No. 3,371,624, dough bodies were supplied in strips of dough to the forming apparatus via a simple conveyor, as indicated generally at 75 in that patent. In order to transport a strip of dough to the feeding station of the apparatus at the right time, preparatory to a passing of a dough forming assembly through the feeding station where it picks up such strip of dough, it had been necessary to hand-feed the dough strips onto the conveyor while visually timing such feeding to the operation of the apparatus. In my copending application Ser. No. 232,759, filed Mar. 8, 1972 and entitled "Dough Transport and Feed Apparatus", now abandoned I disclosed an apparatus for feeding individual dough bodies to a torroid forming apparatus, as in my U.S. Pat. No. 3,371,624, in a timed predetermined sequence from a supply thereof advancing upon a conveyor in a generally random sequence. Also in my copending application, I disclosed an apparatus wherein individual dough bodies in generally round strip configuration may be selected from a supply of one or more contiguous bodies with the non-selected bodies being held off until desired and transporting such individual dough bodies in timed sequence to the dough forming apparatus. The aforementioned apparatus also included provisions for a positive discharge of individual dough bodies from dough receiving means at a predetermined discharge location and transport means were provided for rapidly transporting such selected and sequenced dough body to the toroid forming apparatus.

The dough transport and feed apparatus as disclosed in my copending application was capable of being fully integrated into and cooperable with the toroid forming apparatus of my prior U.S. Pat. No. 3,371,624 and also cooperable with a dough supplying means including a conveyor advancing dough bodies of generally cylindrical form in a random manner.

The aforementioned dough supplying means in my copending application was merely described as a conveyor. However, it is desirable that the strips of dough being fed to the dough-receiving means of my copending application Ser. No. 232,759 be preformed into cylindrical strips of a generally predetermined diameter and length. In addition, such preforming and feeding apparatus should be capable of being fully integrated into and cooperable with the toroid forming apparatus of my prior U.S. Pat. No. 3,371,624 and the strip transport and feed apparatus of my copending application Ser. No. 232,759. Finally, certain features of the apparatuses disclosed in both my prior U.S. Pat. No. 3,371,624 and my copending application Ser. No. 232,759 have been improved in a manner to be described further hereinbelow.

SUMMARY OF THE INVENTION

It is an object of this invention to provide a strip of dough preforming and feeding apparatus for preforming individual strips of dough and feeding the preformed strips to a strip transport and feed apparatus, as disclosed in my copending application Ser. No. 232,759, then feed the individual strips of dough in a timed predetermined sequence to a toroid forming apparatus, as disclosed in my U.S. Pat. No. 3,371,624.

It is another object of the present invention to provide strip preforming and feed apparatus for preforming such strips in a manner preventing sticking or jamming of such strips during the preforming and feeding process.

It is still another object of the present invention to disclose improvements in the toroid forming apparatus of my prior U.S. Pat.. No. 3,371,624 for facilitating formation of strips of dough into toroids.

It is still another object of my invention to disclose improvements in the strip transport and feed apparatus of my copending application Ser. No. 232,759 where the strips are discharged from the strip receiving means at the discharge location.

These and other objects are preferably accomplished by providing apparatus for forming individual batches of dough into generally cylindrical strips of predetermined length and diameter and feeding the preformed strips one at a time to a strip transport and feed means. The strips are then conveyed one at a time and at a predetermined rate to a feeding station where the strips are picked up and formed into toroids, the strips being conveyed to the feeding station at a rate related to the toroid formation thereof. The strip preforming and feeding means includes a conveyor for feeding the strips and a pressure plate engaging the strips on the conveyor and having varying spacing between it and the conveyor. Movable sidewalls are also provided for moving the strips along the conveyor. Improved means are provided for forming the toroids as disclosed in my prior U.S. Pat. No. 3,371,624. Improved means are also provided for transporting and feeding the strips to the toroid forming apparatus as disclosed in my copending application Ser. No. 232,759.

BRIEF DESCRIPTION OF THE DRAWING:

FIG. 1 is a top plan view of the preferred exemplary apparatus of strip preforming and feeding apparatus in accordance with the present invention;

FIG. 2 is a side view, partly diagrammatic, of a portion of the apparatus of FIG. 1;

FIG. 3 is a vertical sectional view of the apparatus of FIG. 1 taken along line III—III;

FIG. 4 is a section view of the apparatus of FIG. 1 taken along line IV—IV;

FIG. 5 is a section view of the apparatus of FIG. 1 taken along line V—V;

FIG. 7 is a vertical sectional view of the apparatus of FIG. 6 taken along the line VII-VII thereof;

FIG. 8 is a vertical sectional view, partly in phantom, of the apparatus of FIG. 6 taken along the line VII—VIII thereof;

FIG. 9 is a detailed sectional view of a portion of the apparatus of FIG. 6 taken along the line IX-IX thereof;

FIG. 10 is a view similar to FIG. 9 showing movements of portions of the apparatus thereof;

FIG. 11 is a view similar to a portion of FIG. 8 showing movements of portions of the apparatus thereof;

FIG. 16 is a detailed side view, partly in section, of a portion of the apparatus of FIG. 14;

FIG. 17 is a vertical, partly sectional, view of a portion of the apparatus of FIG. 12 showing a modification thereof; and FIG. 18 is a detailed, partly sectional, view taken along line XVIII—XVIII of the apparatus of FIG. 17.

Figure 6:
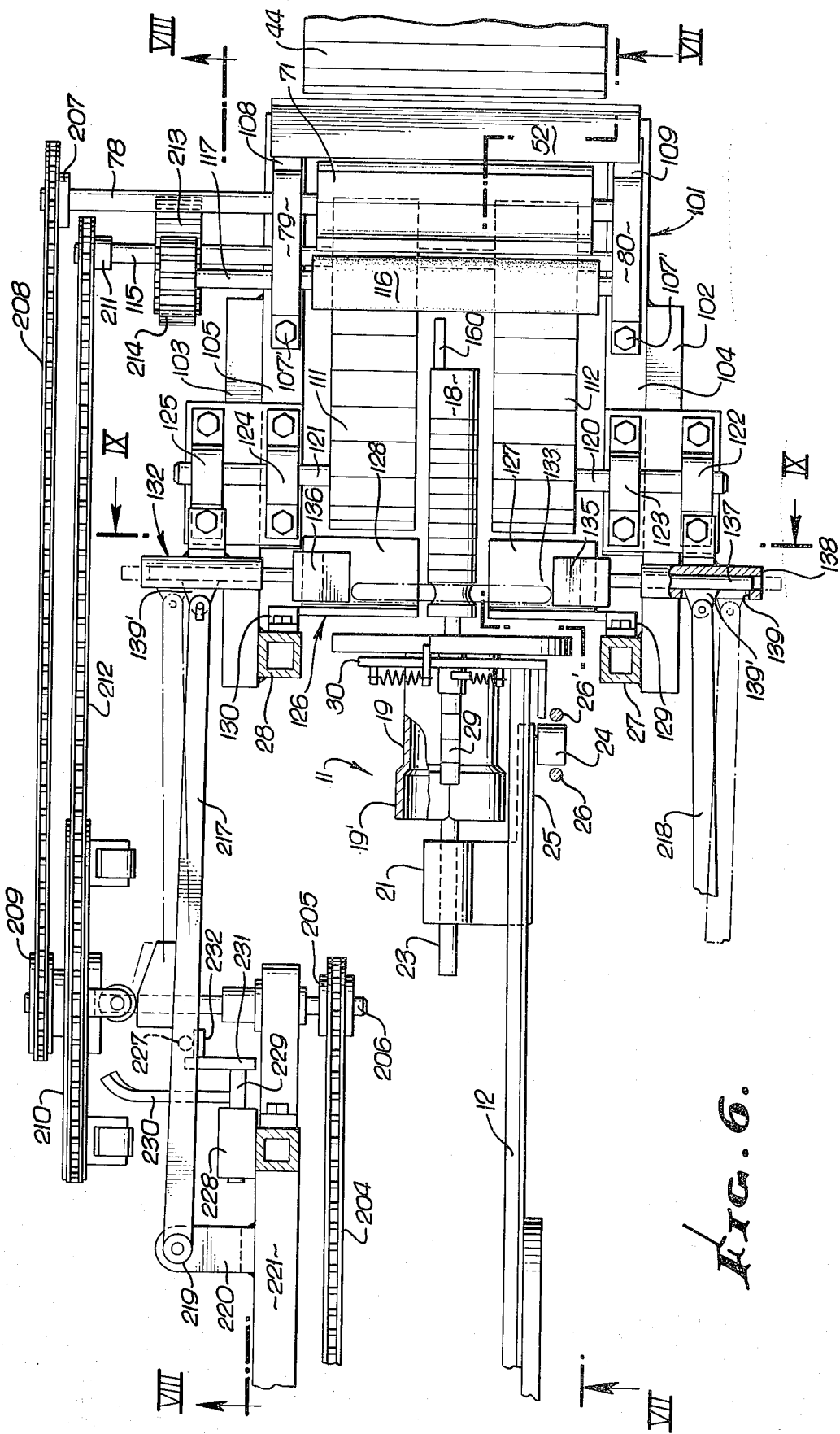
FIG. 6 is a top plan view of a portion of the toroid forming apparatus disclosed in my prior U.S. Pat. No. 3,371,624 and the strip transport and feed apparatus disclosed in my copending application Ser. No. 232,759 showing both improvements in certain parts thereof and its correlation with the exemplary strip preforming and feeding apparatus of FIGS. 1 through 5.

DESCRIPTION OF THE PREFERRED EMBODIMENT:

The preferred exemplary embodiment of strips of dough preforming and feeding apparatus, in accordance with the present invention and as illustrated particularly in FIGS. 1 through 5 is particularly suited for use with the toroid forming apparatus of my prior U.S. Pat. No. 3,371,624 and with the dough strip transport and feeding apparatus disclosed in my copending application Ser. No. 232,759, filed Mar. 8, 1972, and as particularly illustrated in FIGS. 6 through 11. Portions of these apparatuses are illustrated herein in order to facilitate the disclosure of the apparatus of the present invention. While only portions of the apparatuses of my prior patent and copending application are actually illustrated and discussed herein, the entire disclosure of both said U.S. Pat. No. 3,371,624 is included herein by reference and persons skilled in the art are invited to refer to said patent for any additional explanations as to the operation of the toroid forming apparatus as hereinafter generally described.

In accordance with the toroid forming apparatus in my prior U.S. Pat. No. 3,371,624, and as generally illustrated in FIGS. 6 through 11 at reference numeral 10, a plurality of individual toroid forming assemblies, an example thereof being indicated generally at 11, are mounted on a like plurality of support arms, as arms 12 through 15 in FIG. 7, for rotation about a common generally horizontal axis 16. The toroid forming apparatus 10 has a motor means, not illustrated, for driving axis 16 and thus the individual toroid forming assemblies, indicated generally at 11, somewhat like a Ferris wheel, about the apparatus frame to bring the individual assemblies 11 to and throgh a dough strip feeding station provided on apparatus 10 and as indicated generally at 17.

Each individual toroid forming assembly, as indicated generally at 11, includes a mandrel 18, a sleeve means 19 and means for causing relative movement therebetween when a strip of dough 20 has been picked up by mandrel 18. Sleeve means 19 forms an exemplary embodiment of my invention and thus differs from the sleeve means 19 disclosed in my prior U.S. Pat. No. 3,371,624 as will be discussed further hereinbelow.

The means for causing relative movement between the mandrel 18 and sleeve means 19, as in my prior U.S. Pat. No. 3,371,624 include the provision of a foot means for sliding plate 21 which is slidably mounted in a slot 22 provided in the support arm 12 and mounting a rod 23 to which mandrel 18 is secured. A cam roller 24 is mounted to plate 21 by arm 25 to cause sliding movement of plate 21 in slot 22 in response to camming action imparted to roller 24 by the associated cam ways or tracks 26 and 26' mounted to the toroid forming apparatus frame, which includes vertical standards 27 and 28 (see also FIGS. 9 and 10).

As the toroid forming assembly 11 revolves about axis 16, the cam roller 24 is moved radially along the support arm 12 to cause mandrel 18 to be drawn inwardly through sleeve means 19 after a strip of dough has been picked up from the feeding station indicated generally at 17. Each of the sleeve means 19 includes a pair of cylinder halves mounted by hinge means 29 through plate 30 secured to the associated support arm, as arm 12 in FIG. 7.

From the foregoing, it can be seen that the toroid forming apparatus, aside from the modification of sleeve means 19 which does not affect the overall operation thereof, as in my prior U.S. Pat. No. 3,371,624 operates to receive a sequence of strips of dough delivered to the feeding station, indicated generally at 17, where each successive strip is picked up by a mandrel 18 and carried away from the toroid forming operation as explained in my aforementioned patent. However, in the apparatus disclosed in my U.S. Pat. No. 3,371,624, no particular means were provided for providing strips of dough to the feeding station 17 in a sequence timed to the operation of the apparatus. Rather, simple conveyor means were illustrated for supplying individual strips of dough to the feeding station where they could be picked up by the apparatus forming assemblies.

In accordance with the dough strip transport and feeding apparatus in my copending application Ser. No. 232,759, and as generally illustrated in FIGS. 7 and 8, dough strip transport and feeding apparatus, indicated generally at 70, are provided for feeding individual strips of dough to the dough forming apparatus, indicated generally at 10, in a timed sequence from the supply thereof advancing thereto from a strips of dough forming and feeding apparatus, indicated generally at 40, as will be discussed hereinbelow, and in a generally random sequence. In accordance with the present invention, means are provided for accepting strips of dough from the apparatus 40 one at a time and at a predetermined rate and delivering them at a timed sequence thereof to a discharge location. In the preferred exemplary embodiment, such strips of dough accepting means includes a cylindrical member 71 mounted on and rotatable by a shaft 78 journaled in journal bearings 79 and 80, as best seen in FIG. 6. Member 71 is provided with a plurality of notches 81 through 84, on member 71 as best seen in FIG. 7, for receiving individual dough strips, as strips 85 and 86 in FIG. 7. Each of the notches 81 through 84 is semicircular and of a size larger than the expected diameter of the cylinder strips of dough, as strips 85, 85' and 86 emitted from the supply thereof upon a strip forming and feeding apparatus, indicated generally at 40. Since the member 71 is of cylindrical configuration, the segments between notches, as segments 87 through 90 on member 71 as seen in FIG. 7, present outwardly curved surfaces between the respective recesses to hold off strips of dough, as segment 88 is moving into position to hold off strip 86, until the next recess, as recess 84, comes along to receive and pick up a strip, as strip 86, individually and in a predetermined relation to the operation of the strips of dough forming and feeding apparatus, as indicated generally at 40, and as hereinafter explained. As seen in FIG. 7, dough bodies 85 and 85' have been received and are being carried away in recesses 82 and 81, respectively, while the next adjacent, randomly presented dough body 86 will be held off by segment 88 until it is accepted and carried away in the next successive recess 84.

The dough accepting means may be one integral long cylindrical member, as disclosed, or may be a plurality of spaced individual notched discs of cylinders as disclosed in my copending application Ser. No. 232,759.

Accordingly, if a plurality of notches, discs or members are used as in my copending application, the stop means or fingers disclosed therein may also be used. In any event, as a strip of dough is carried about the dough accepting means from the end of ramp 52, counterclockwise in FIG. 7, it is discharged at a discharge location as indicated by the position of strip 97.

the dough accepting means heretofore described is mounted upon an auxiliary frame, indicated generally at 101, which is secured to the toroid forming apparatus, including the vertical standards 27 and 28. The exemplary embodiment of transport means to be described hereinafter is also mounted upon such sub-frame. In the exemplary embodiment, the sub-frame for mounting the strips of dough transport and feed apparatus, indicated generally at 70, includes a pair of generally horizontal frame members 102 and 103 welded to and cantilevered from the toroid forming apparatus vertical standards 27 and 28, as best seen in FIG. 6. A second pair of horizontal frame members 104 and 105 are welded inboard of members 102 and 103 as best seen in FIG. 6. A horizontal cross member 106 is welded between arms 104 and 105, arm 106 being seen in cross section in FIG. 7. Further, as seen in FIG. 6, bearings 79 and 80 may be supported on frame members 104 and 105 in any suitable manner, such as by suitable nut-and-bolt arrangements 107', securing bearings 79 and 80 to angle iron flanges 108 and 109 extending from and secured to frame members 104 and 105, respectively.

Transport means are provided in the preferred exemplary embodiment for transporting the individual strips of dough, as strip 97, from the discharge location, indicated by the position of body 97 in FIG. 7, to the feeding station, indicated generally at 17, also as illustrated in FIG. 7, of the toroid forming apparatus, such transport means includes the provision of conveyor means, indicated generally at 110, for conveying a strip of dough, as body 97, from the discharge location, indicated by the position of body 97 in FIG. 7, to the feeding station indicated generally at 17. In order to facilitate the pick-up of a strip of dough at the toroid forming apparatus feeding station, indicated generally at 17, by the mandrel 18, as aforedescribed, the preferred exemplary embodiment of conveyor means, indicated generally at 110, includes the provision of two spaced conveyor belts 111 and 112, which may be of a suitable plastic material or the like, with a spacing therebetween, as seen in FIG. 6, of sufficient extent to allow the passage of mandrel 18 therebetween when such mandrel 18 is moving in an arcuate pick-up motion through the feeding station, indicated generally at 17. The conveyor belts 111 and 112 are each, respectively, mounted upon rear sprockets 113 (only one visible in FIG. 7) secured to rear sprocket shaft 115 which in turn is also journaled in bearings 79 and 80. The forward conveyor belt sprockets 118 (only one visible in FIG. 7) are individually mounted upon their respective sprocket shafts 120 and 121 (see FIG. 6) journaled in and cantilevered from the double journaled bearing mountings, including bearings 122, through 125. By this mounting, each of the forward pulleys 118 on pulley shafts journaled at one end only, spacing is provided between pulleys 118 to allow passage therebetween of mandrel 18 in its strip of dough pick-up movement as aforedescribed, as it passes through the position as shown in FIG. 6.

By comparing FIGS. 6 and 7, it can be seen that a strip of dough discharged from the strip of dough accepting means, as body 97, is conveyed by the pair of spaced conveyor belts 111 and 112 toward the feeding station, indicated generally at 17, of the toroid forming apparatus, indicated generally at 10. The forward and rear sprockets 118, 113 engage chains 119 (only one visible in FIG. 7) carrying belts 111, 112 thereabout. Also, in an exemplary embodiment of my invention, means may be provided for engaging the strips of dough as they exit from the strip of dough accepting means onto the discharge location. Such means includes a roller 116 mounted on a shaft 117 also journaled in bearings 79, 80. As can be seen in FIG. 7, roller 116 is preferably of a resilient material, such as rubber, and is mounted for rotation in a direction opposite to the rotation of member 71 (i.e., a clockwise direction). Roller 116 is spaced from and above the belt 111 and 112 and adjacent member 71. Thus, it can be seen that the strip of dough 97 discharged at the discharge location passes under roller 116 and is rolled along belts 111 and 112 thus both advancing their movement and further rolling and strips of dough, such as strip 97, in an elongated cylindrical form having a particular diameter (i.e., the diameter being related to the spacing between roller 116 and belts 111 and 112). The strip 97 thus is moved via conveyor means 110 to a point adjacent the feeding station, as strip 97'.

In the preferred exemplary embodiment, a bifurcate cup or plate or strip of dough receiving support means 126 is provided at the forward end of belts 111 and 112 to receive a strip of dough thereon. As best seen in FIG. 6, such bifurcate cup or plate means 126 includes two halves 127 and 128 mounted by end flanges 129 and 130, respectively, to the toroid forming apparatus frame members 27 and 28. A space, indicated generally at 131, is left between cup or plate halves 127 and 128 exposing a central portion of a strip of dough in support means 126, as strip 97" in FIG. 9, to be picked up by mandrel 18 as it passes through its positions, as by moving from the FIG. 9 to the FIG. 10 position. As particularly contemplated within the present invention, centering means are provided for centering the strips of dough in the feeding station 17. In the exemplary embodiment, as shown in FIGS. 6 through 10, such centering means, indicated generally at 132, comprises a pair of slots 133 and 134 formed along each half 127, 128, respectively. A pair of blocks 135 and 136 are slidably mounted in each slot 133 and 134 and are coupled to shafts 137 slidable within a hollow generally cylindrical member 138. Each manner 138 has a slot 139 therein (see particularly FIG. 6) for receiving a flange member 139' fixedly connected to each shaft 137.

The operation of the centering means, indicated generally at 132 will be described further in detail hereinbelow. However, it can be seen that blocks 135 and 136 in the FIG. 9 position engage the free ends of strip 97" disposed between halves 127 and 128. Mandrel 18 is in position to pick up strip 97". FIG. 10 illustrates the movement of mandrel 18 to pick up strip 97" and form it into the initial generally U-shaped strip of dough 20. Blocks 135 and 136 are retracted within slots 133 and 134 to facilitate the disengagement of strip 97" and are ready to be moved back into the FIG. 9 position preparatory to centering another strip 97". Thus, the strip of dough 20 is formed into such configuration prior to being drawn inwardly of sleeve means 19, as described in detail in my copending application Ser. No. 232,759 and prior U.S. Pat. No. 3,371,624, to form the strip 20 into a toroid by the toroid forming apparatus, indicated generally at 10.

Referring back to FIGS. 6 and 7, as in my copending application Ser. No. 232,759, each of the sleeve means 19, also as indicated hereinabove, includes a pair of cylinder halves mounted by hinge means 29 through plate 30 secured to the associated support arm, as arm 12 in FIG. 7. The stationary cup half in this exemplary embodiment of my invention includes means for facilitating discharge of the strip 20 from the sleeve means 19. Such means comprises an enlarged or outwardly relieved end portion 19' on the stationary half of sleeve means 19 (see particularly FIG. 6) so that the toroid separates therefrom as it is moved axially down the sleeve means 19 as described in detail in my prior U.S. Pat. No. 3,371,624. In this exemplary embodiment of my invention, the take-away pin 160, as described in my prior U.S. Pat. No. 3,371,624 pulls the strip of dough 20 away from the hinging half of sleeve means 19, separation from the stationary half thereof being facilitated by the lower quadrant relieved portion 19' thereon.

It is contemplated within the present invention that dough bodies in strip form will be delivered in generally random sequence to the strip of dough transport and feed apparatus, indicated generally at 70, from a strip of dough forming and feeding apparatus, indicated generally at 40. Conventional dough machines are available on the market which receive large lumps or batches of dough and mechanically divide them into accurately measured pieces or bodies. These pieces of bodies are thus in generally cylindrical rolled form of relatively large diameter prior to delivery to the dough forming and feeding apparatus, indicated generally at 40. A portion of a conventional conveyor 40' is thus shown in FIGS. 1 through 3 which forms part of the conventional dough divider apparatus as aforementioned. Conveyor 40' is rotated by a roller 41' (FIG. 2), the other roller not being shown. A piece of dough 40" is shown on conveyor 40' prior to being delivered to the strip of dough forming and feeding apparatus, indicated generally at 40. Apparatus 40 thus includes an upper conveyor strand support plate 41 (FIG. 3) which may be mounted to the forming and feeding apparatus 40 by support channels 42 and 43.

Referring to FIGS. 1 and 3, an endless conveyor belt 44 is driven by sprockets 45 and 46 having shafts 47 and 48, respectively, journaled for rotation in mounting brackets or journals 49 and 49' associated with shaft 47 and journals 50 and 50' associated with shaft 48, those journals being secured to base plate 63. A discharge ramp 51 having an upper ramp service 52 is mounted to frame members 104 and 105 of FIG. 6. As seen in FIGS. 3 through 5, an endless chain 53 extends about sprockets 45 and 46 and is driven thereby. A slot 54 is formed in plate 41 as shown in FIGS. 4 and 5 for receiving chain 53 therein. Belt 44 may be of plastic material or the like, if desired, and secured to chain 53 as by L-shaped brackets 55.

Individual dough bodies delivered from the conveyor 40' onto the conveyor means, indicated generally at 40, are rolled by the belt 44 as indicated by the arrows in FIG. 3 beneath a pressure plate 56. This plate 56 may have a spacing larger at one end than the other; that is, the spacing between the underside of plate 56 and the upper surface of belt 44 may taper or vary from the right side of FIG. 3 to the left side thereof as shown. Pressure plate 56 may be provided with an underside covering 56' of a suitable conveyor material layer, if desired.

The vertical positioning of plate 56 maybe adjusted by turning bolts 57 and 58 at one end threaded onto threaded shafts 59 and 60 extending upwardly from plate 41. Suitable apertures are provided in a bracket member 61 for receiving shafts 59 and 60 therethrough. This bracket member 61 has a generally centrally located downwardly extending sleeve portion 62 (FIG. 5) operatively connected to the upper surface of plate 56' so that, by tightening bolts 57 and 58 against bracket member 61, plate 53 can be selectively raised and lowered at one end thereof between member 61 and plate 41. Of course, such means is only exemplary and any suitable means may be used. If desired, bracket member 61 may be slotted for lateral adjustment as in my copending application.

Base plate 63 extends along the underside of apparatus 40 and channels 42, 43 extend upwardly therefrom. Leg members 64 may be provided on the underside of plate 63 for supporting apparatus 40.

Similar upright threaded shafts 64 and 65 are provided on plate 41 at the other or left end of plate 56 as shown in FIG. 1. These shafts 64 and 65 also extend through suitable apertures in a bracket member 66. Bracket member 66 includes a downwardly extending L-shaped flange plate 67 bolted thereto at one end and bolted to plate 56 at the other end as shown in FIG. 3. Helical springs 68 may be provided surrounding shafts 64 and 65 between plate 41 and bracket member 66.

A pair of sprocket members 69 and 69' are threaded onto the free ends of shafts 64 and 65 and have bracket member 66 secured thereto. A pressure plate adjusting lever in the form of a generally circular plate 71' having a knob 72 thereon is carried by one of the sprocket members, such as member 69. It can readily be seen that the rotation of plate 71', via knob 72, also rotates the other sprocket member 69' via endless chain 73 to thus quickly and easily vary the spacing between the underside of pressure plate 56 and the upper surface of belt 44.

In the exemplary embodiment of the invention, strips of dough guide means are provided for guiding the strips of dough and eliminating drag thereon as they are conveyed along belt 44. Such guide means is indicated generally at 170 and includes a pair of moving sidewalls in the form of endless belts 171 and 172, which may be of a plastic material or the like, and are rotated by spaced pulleys 173 and 174 for rotating belt 171 and pulleys 175 and 176 for rotating belt 172. Idler rollers 177 and 178 are associated with each belt 171 and 172 and are mounted on suitable shafts 179 and 180 extending upwardly from plate 41. Adjusting means in the exemplary form of a pair of adjusting plates 181 and 182 are also associated with each belt 171 and 172 for lateral adjustment thereof. Each plate 181 and 182 is disposed on plate 41 and includes spaced slots 183 and 184 therein for receiving spaced threaded shafts 185 and 186 extending upwardly from plate 41. Nuts 187 are threaded onto the free ends of shaft 185 and 186 and are greater in diameter than the width of slots 183 and 184 so that nuts 187 may be tightened against plates 181 and 182. It can be seen that plates 181 and 182 are configured to partially encircle the rollers and also include cut-out portions 188 and 189 to provide for shafts 64 and 65 and associated parts thereof.

One of each pair of the pulleys, for example, pulley 173 and pulley 175 in the exemplary embodiment, includes a shaft (190 and 191) extending downwardly through a suitable aperture in plate 41 to a journal member 192 fixedly secured to base plate 63. Thus, shafts 190 and 192 rotate within members 191 to also rotate pulleys 173 and 175 and thus pulleys 174, 176 and belts 171 and 172. These shafts 190 and 191 are rotated by worm gears 193 and 194 fixedly secured thereto and in meshing engagement with a pair of small sprockets 195 and 196 fixed for rotation with shaft 47. Thus, as shaft 47 is rotated as will be discussed hereinbelow, pulleys 173 through 176 and thus belts 171 and 172 are also rotated.

It can be seen in FIG. 2 that the piece of dough 40'' is about to be deposited onto belt 44. The various positions of the dough on belt 44 are indicated by reference numerals 197 through 201. The piece 197 is relatively thick as indicated in FIG. 5. As the spacing between plate 56 and belt 44 narrows, the piece 197 is gradually pressed down under pressure of plate 56 so that, for example, piece 198 is not as thick as piece 197 and is wider than piece 197. Piece 199, for example, is still thinner and longer. Finally, piece 200, which is generally related to the piece 20₂ shown in FIG. 4, is elongated and cylindrical. Thus, by comprising FIG. 5 with FIG. 4, it can be seen that the relatively thick lump or piece 197 has been rolled, via plate 56 and belt 44, into the strip 201 of FIG. 4. Simultaneously, as shown in FIG. 4, the moving guide means, indicated generally at 170, guides the strips of dough thus flattening the ends to form strips of generally uniform length. In addition, the ends of these strips being so formed do not drag along the sidewalls and bend into generally arcuate shapes making them longer than desirable as in prior art devices where such walls are stationary, but are guided therealong. Also, as will be discussed further hereinbelow, the belts 171 and 172 are moved in timed relation to the speed of the dough strips moving along the space formed between plate 67 and belt 44, as for example, at one-half the speed thereof. These completed strips are then discharged onto the service 52 of ramp 51 as indicated by piece 201 in a relatively smooth transfer.

Drive means are provided for driving the dough transport and feed apparatus, indicated generally at 70, in timed coordinated relation to the operation of the toroid forming apparatus, indicated generally at 10, in order to provide individual strips of dough at the feeding station, indicated generally at 17, upon bifurcate cup or strip support means 126 preparatory to the passage therebetween of a toroid forming apparatus mandrel, as mandrel 18, all as described in detail in my co-pending application No. 232,759. Referring to FIG. 7, the toroid forming apparatus forming assemblies are each mounted upon support arms, as arms 12 through 15 for rotation about a central drive shaft 16. In the preferred exemplary embodiment, a drive gear 203 (FIG. 8) is mounted upon shaft 16. Drive chain 204 is assembled about the drive gear 203 at one end and about a driven gear or pinion 205 at its opposite end. Gear 205 is fixed upon a conveyor means drive shaft 206 (see particularly FIG. 6). Since gear 205 is considerably smaller than drive gear 203, the conveyor belt shaft 206 is rotated quite rapidly compared to the rate of rotation of toroid forming apparatus drive shaft 16. In operating a preferred exemplary embodiment of the strip of dough transport and feed apparatus indicated generally at 70 and disclosed in my copending application, the strips of dough forming and feeding apparatus indicated generally at 40 and the toroid forming apparatus of my prior U.S. Pat. No. 3,371,624, I have found that the conveyor belts 111, 112 and belt 44 should be operated at between 50 to 60 feet per minute in order to move the dough bodies rapidly from the strips of dough forming and feeding apparatus indicated generally at 40 to the strip receiving means discharge location indicated generally at 70, then to the toroid forming apparatus feeding station, indicated generally at 17. Further, the preferred exemplary embodiment of the toroid forming apparatus of my prior U.S. Pat. No. 3,371,624 shows eight toroid forming assemblies mounted upon eight respective support arms. In the preferred exemplary embodiment of apparatus in accordance with the present invention, there are four longitudinally extending recesses or strip receiving channels provided in the strip receiving means, indicated generally at 70. Therefore, member 71 must be rotated at twice the speed of the support arms of the toroid forming apparatus in order that a strip of dough may be provided to the feeding station 17 of the toroid forming apparatus 10 for each toroid forming assembly 11 as it passes therethrough. The strip receiving means drive shaft 78 is provided with a drive gear 207 (FIG. 6) which is driven by chain 208 which in turn is driven by a gear 209 secured to the conveyor drive shaft 206. As seen in FIGS. 6 and 8, a large drive gear 210 is also mounted for rotation on shaft 206. A small gear 211 is mounted on shaft 115 for rotation therewith. Gear 211 is driven by an endless chain 212 extending from gear 210. A larger gear 213 is also mounted on shaft 115 and in meshing engagement with a gear 214 for rotating shaft 117 in a direction opposite that of receiving means 71. The aforementioned gear 213 is of course mounted on shaft 115 and thus rotated thereby to move belt 111.

Referring back to FIG. 1, shaft 47 includes a gear 215 at one end thereof and an endless chain 216 extends about gear 215. It is to be understood that chain 216 may extend to a gear (not shown) on shaft 48 so that shaft 46 may be rotated to thus move belt 44. Any suitable motive means (not shown) may be coupled to either shaft 48 or 46 for rotating the same. Of course, belts 171, 172 are likewise rotated via gears 193, 194 and sprockets 195, 196. The aforementioned motive means for driving belts 44, 171 and 172 may be independent of the means for rotating shaft 16. However, the speed thereof may be fixed and varied, if desired, so that it receives the batches or pieces of dough from conveyor 40' in a timed relationship. If desired, the means for rotating conveyor 40' may be keyed to the rotation of shaft 16.

Referring now to FIGS. 6 and 8 through 11, the means for operating the centering means, indicated generally at 132, will now be described. In this exemplary embodiment of the invention, lever arms 217 and 218 are pivotally connected to each flange member 139'. The free ends of arms 217 are pivotally connected, via member 219, to flange members 220 fixedly secured to elongated members 221 extending generally parallel to chain 204 as shown in FIG. 6.

As shown particularly in FIGS. 8 and 11, a plurality of rollers, such as rollers 221 through 224, are mounted at spaced locations on the face or inwardly extending surface 225 of drive gear 210. As seen in both FIGS. 6 and 8, a camming member 226 is carried by each arm 217, 218. A first pin 227 extends generally normal to each arm 217, 218. Elongated member 221 is fixedly secured to shaft 206 and includes a housing member 228 (FIG. 6) having a shaft 229 rotatably mounted therein. A camming arm 230 is fixedly secured to shaft 229. A second pin 231 is carried at the free end of shaft 229 extending generally normal thereto and also carries at its free end a third pin 232 also extending generally normal thereto. As can be seen in dotted lines in FIG. 6, pin 232 abuts against pin 227.

In operation, FIG. 9 shows the normal centering or "in" position of the centering means indicated generally at 132. This is also the solid line position of arms 217, 218 in FIG. 6. As shown in FIG. 11, gear 210 turns with the Ferris wheel arrangement of the toroid forming apparatus, indicated generally at 10, as discussed in my prior U.S. Pat. No. 3,371,624. As gear 210 rotates, every 90° of revolution thereof actuates the centering means, indicated generally at 132. That is, arm 230 is in the path of movement of rollers 221 through 224 and is cammed thereby to pivot within housing member 228. This pivotal movement moves pin 232 against pin 227 and thus arms 217, 218 to the dotted line position in FIG. 6. This movement of arms 217 and 218 also moves flange members 139' and shafts 137 of FIGS. 9 and 10 to the "out" position of FIG. 10. The engagement of camming member 226 with the next roller returns arms 217 and 218 back to the solid line or in position of FIG. 9.

From the foregoing, it can be seen that the aforestated objects and advantages of the invention have been attained. Individual batches of dough from a dough divider are preformed into strips of dough, then fed to a receiving station where they are individually conveyed to a feeding station. At the feeding station, the strips are centered, picked up and formed into toroids. The strips are fed from the receiving station to the feeding station in timed relationship to the operation of the toroid forming apparatus.

As discussed hereinabove, the dough bodies in strip form are delivered in generally random sequence to the strip of dough transport and feed apparatus, indicated generally at 70, from a strip of dough forming and feeding apparatus, indicated generally at 40. This apparatus 40 constitutes one embodiment of means for forming a strip of dough from premeasured batches of dough received from a conventional dough machine and feeding such strips to the dough transport and feed apparatus, indicated generally at 70.

Thus, as particularly contemplated within the present invention, another embodiment of the strip of dough forming and feeding apparatus indicated generally at 40 and illustrated in FIGS. 1 through 5, is presented herein. Referring now to FIGS. 12 through 16 of the drawing, strip of dough forming and feeding apparatus is provided as another embodiment of the invention for accepting batches of dough, preforming them into strips of dough and transporting them to the dough transport and feed apparatus, indicated generally at 70. In the alternate embodiment, such dough accepting, preforming and transporting apparatus, indicated generally at 240, is also adapted to receive pieces or bodies of dough in generally cylindrical rolled form of relatively large diameter prior to delivery to the apparatus 240. Thus, as discussed hereinabove with respect to FIGS. 1 through 3, a portion of a conventional conveyor 40'identical to that of FIGS. 1 through 3 is shown which forms part of the conventional dough divider apparatus as aforementioned. Conveyor 40' is rotated by a roller 41', the other roller not being shown. A piece of dough 40'' is shown on conveyor 40' prior to being delivered to the apparatus 240.

Figure 12:
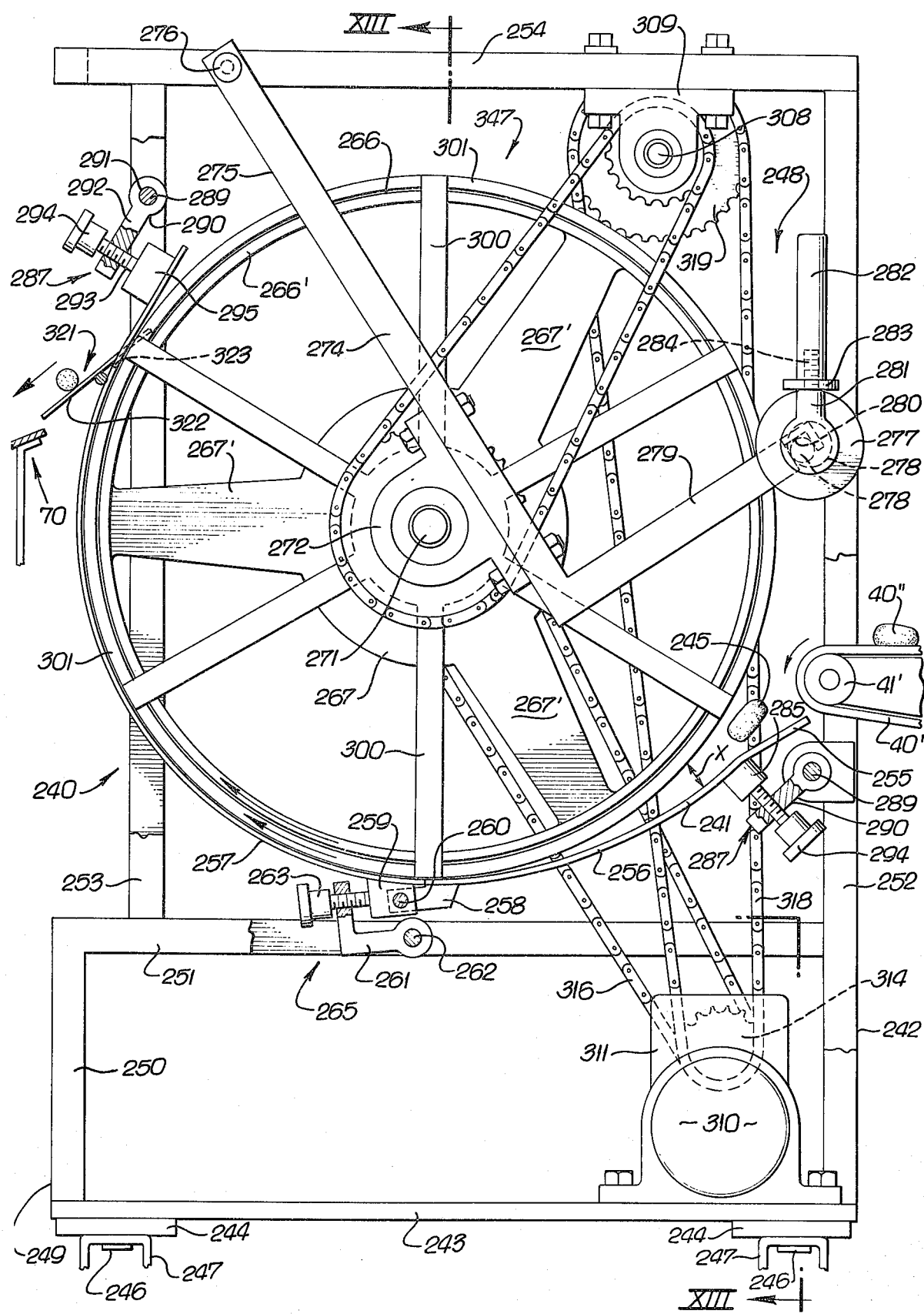
FIG. 12 is a vertical, partly sectional, view of an alternate embodiment of strip preforming and feeding apparatus in accordance with the invention.
Figure 13:
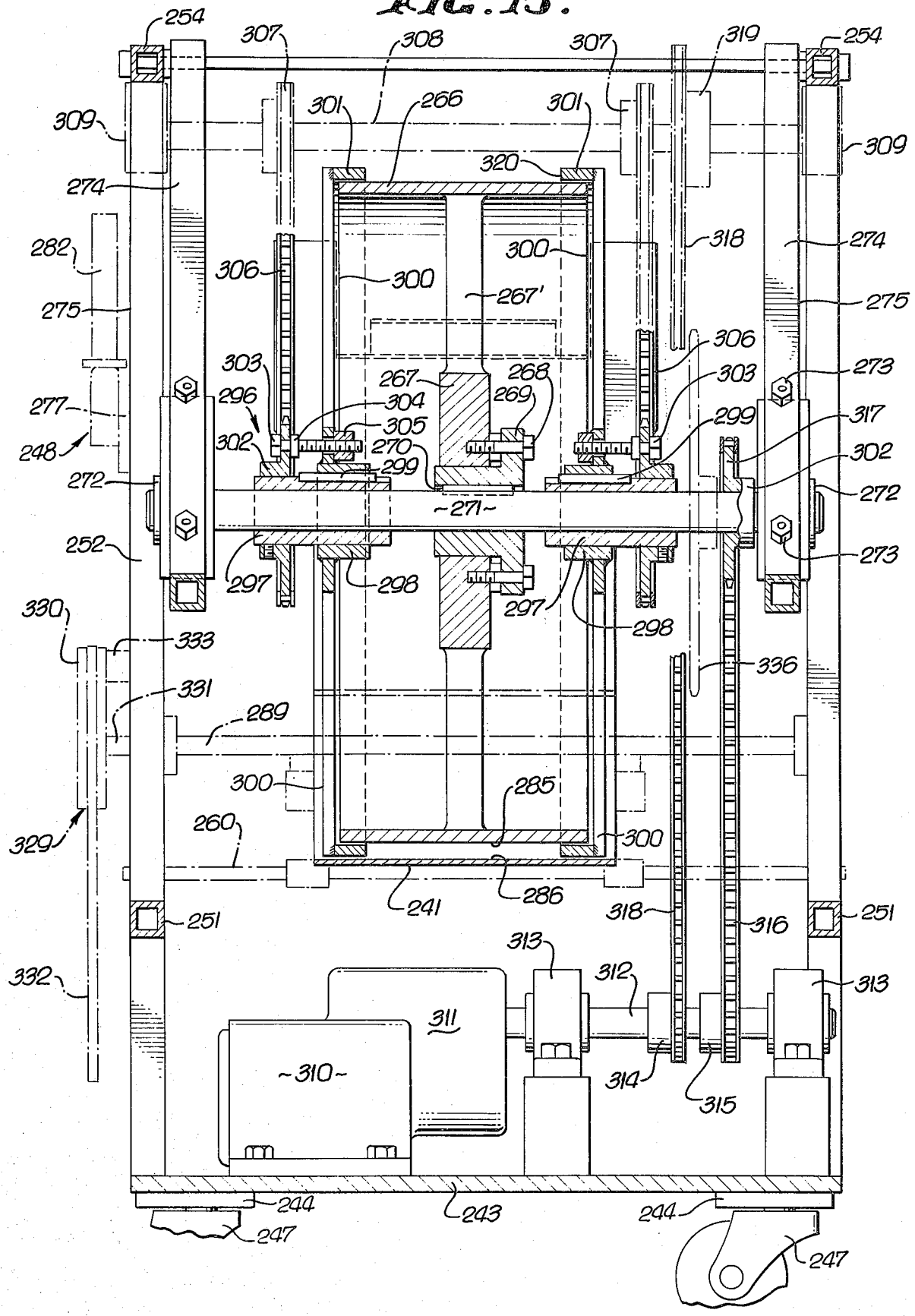
FIG. 13 is a view, partly sectional, taken along lines XIII—XIII of the apparatus of FIG. 12.

Thus, referring to FIGS. 12 and 13, apparatus 240 includes an upright frame 242 having a bottom frame member 243 having flange plates 244 fixedly secured at each corner thereof (see FIG. 13). These plates 244 bolted thereto, via bolts 246 or the like, to casters 247 (see FIG. 13), for movably mounting frame 242 at a suitable location with respect to both the strip of dough transport and feed apparatus, indicated generally at 70, and the conveyor 40'.

A pair of L-shaped frame members 249 have their short legs 250 fixedly secured to one end of frame member 243 and their longer legs 251 fixedly secured to upright members 252 fixedly secured to the other end of frame member 243 and extending upwardly generally vertical therefrom.

A pair of second upright members 253 are fixedly secured to each L-shaped member 249 adjacent the junction of legs 250 and 251 and also extend generally upwardly therefrom. Members 252 and 253 terminate in ends lying in generally the same horizontal plane and these ends are thus fixedly secured to top frame members 254.

As particularly contemplated within the embodiment of the present invention, means are provided for accepting batches of dough from conveyor 40', preforming them into strips and feeding preformed strips to the dough transport and feed apparatus, indicated generally at 70. In this embodiment, such means, indicated generally at 347, comprises a ramp 241 (see particularly FIGS. 12 and 13) having a first generally straight ramp portion 255 disposed adjacent conveyor 40' for receiving bodies of dough (e.g., a body of dough 245 is shown as being about to engage ramp portion 255 after being conveyed thereto from conveyor 40' — the piece of dough 40'' on conveyor 40' being in position for falling by gravity onto ramp portion 255).

A second generally arcuate ramp portion 256 is integral with first ramp portion 255. A third generally arcuate ramp portion 257 is releasably secured to the second ramp portion 256.

It can be seen that, in addition to accepting batches of dough from conveyor 40', ramp 241 also acts as a pressure plate similar to pressure plate 56 of the FIG. 2 embodiment.

Means may also be provided for facilitating cleaning of ramp 241. Such means, indicated generally at 265, includes, in addition to ramp 256 and 247, a flange member 258 fixedly secured to the outer periphery of second ramp portion 256 adjacent its junction with third portion 257. A flange member 259 is fixedly secured to the outer periphery of third ramp portion 257 adjacent its junction with second ramp portion 256.

As can be seen in phantom in FIG. 13, a releasable pin 260 extends through suitable apertures in each flange 258 and 259. An L-shaped arm member 261 is fixedly secured, via a rod or pin 262 non-rotatably through an aperture in one leg thereof, to the longer leg 251 of frame member 249. The other leg of arm member 261 includes a threaded aperture therein for threadably receiving an adjusting screw 263 therein. The free end of screw 263 is fixedly secured to flange member 259. In this manner, removal of pin 260 and unthreading of screw 263 releases the ramp portions 256 and 257 to facilitate cleaning thereof.

The means 347 further includes a wheel 266, somewhat like a Ferris wheel, which includes a first hub portion 267 (see FIG. 13) secured by arms 267' to an outer 266'. Hub portion 267 is removably secured, via screws 268, to a second hub portion 269, keyed for rotation, via keyway 270, to a main shaft 271. Mainshaft 271 is journalled for rotation in suitable bearing members 272 removably secured, via nuts and bolts 273 or the like (FIG. 12), to the elongated arms 274 of a generally L-shaped adjusting arm 275. The free ends of each arm 274 is pivotally connected, via pivot pin 276, to frame 242. The operation of the wheel 266 and its relation to ramp 241 for forming the strips of dough while conveying them to apparatus 70 will be described further hereinbelow. It will be appreciated, however, that the relationship of ramp 241 with wheel 266 results in a spacing x therebetween which gradually diminishes as will be discussed further.

As particularly contemplated within the present invention, means are provided for varying or adjusting the thickness of the strips of dough being fed into the strip of dough forming and feeding apparatus, indicated generally at 240. In the exemplary embodiment, such adjusting means, indicated generally at 248, comprises a pair of lock discs 277 fixedly secured to each upright member 252. The shorter legs 279 of each adjusting arm 275 terminate in open slotted ends 280 which receive an elongated rod 278 therein. Rod 278 is mounted for rotation in suitable bearings (not shown) mounted on members 252 extending across frame 242 to both discs 277 (the one disc 277 is shown in FIG. 12 and the other is shown in phantom in FIG. 13). Rod 278 extends through suitable apertures in discs 277 and at each end has a short stub 278' welded or the like thereto. A retaining member 281 retains the open slotted end 280 of each adjusting arm 275 and has a suitable aperture for receiving rod 278 and stubs 278' for rotative movement therein. It can therefore be seen in FIG. 12 that adjusting arm 275 is eccentrically mounted with respect to rod 278. That is, the rod 278 is off-center with respect to the central axis of a rod member 282, having an abutting flange 283, which threadingly receives therein a threaded portion 284 integral with retaining member 281. Flange 283 thus abuts against disc 277 in frictional engagement when rod member 282 is threaded on threaded portion 284 to thereby lock it in position.

Figure 14:
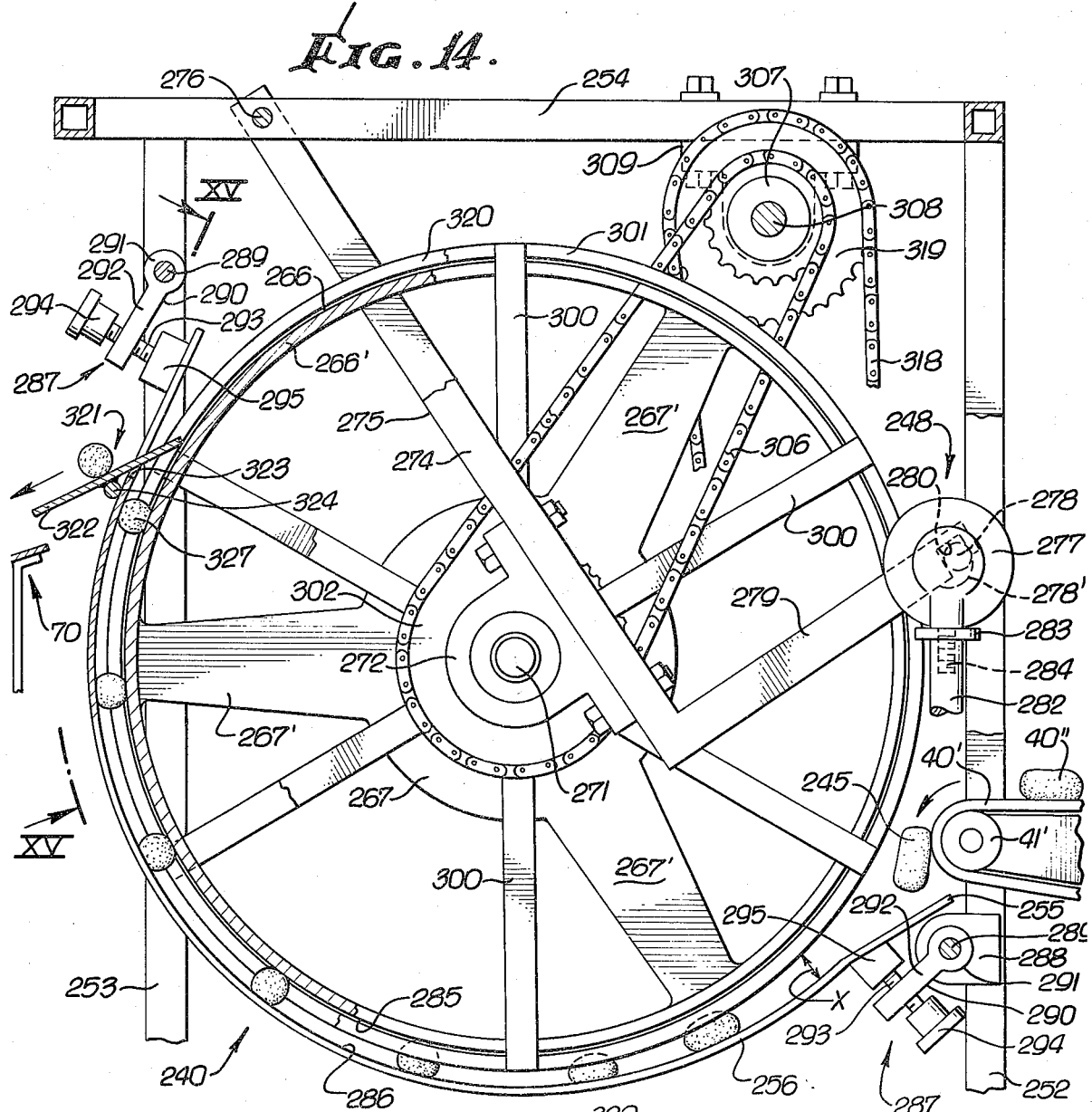
FIG. 14 is a vertical view, partly sectional, similar to a portion of the view of FIG. 12 showing a second position of parts thereof.

As can be seen by comparing FIGS. 14 and 16, the spacing x between the outer periphery 285 of wheel 266 and the inner peripheral surface 286 of ramp 241 is adjustable. This is accomplished by loosening rod members 282 by unthreading them from frictional engagement with discs 277 and swinging or rotating them between the FIG. 14 and the FIG. 12 positions. The eccentric mounting of rod 278 pivots the adjusting arms 275 about pivot pin 276 to thereby shift the center of rotation of shaft 271 since shaft 271 is carried by bearing members 272 mounted to arms 275. This varies the spacing x between the outer periphery 285 of wheel 266 and the inner peripheral surface 286 of ramp 241. FIG. 12 shows the position of members 281 for minimum thickness (i.e. a minimum spacing x) for forming the strips of dough and FIG. 14 shows the position of members 281 for maximum thickness. Of course, the members 281 may be rotated between these positions to obtain various thicknesses of the strips of dough.

As can be seen in FIGS. 12 and 14, the strips of dough, for example, the strip of dough 245 in FIG. 12, is deposited on ramp 241 from conveyor 40' as discussed hereinabove. In addition to the aforementioned means for varying or adjusting the thickness of the strips of dough by varying the spacing between wheel 266 and ramp 241, indicated generally at 248, as particularly contemplated within the present invention, means are provided to varying the gradually diminishing spacing x between the outer periphery 285 of wheel 266 and the inner peripheral surface 286 of ramp 241. Such means also varies the pressure between ramp 241 and wheel 266.

In this embodiment, such means, indicated generally at 287, comprises a pair of flanges 288 fixedly secured to each upright member 252. A shaft 289 extends through suitable apertures in each flange 288 (shown in phantom in FIG. 13). A pair of bracket members 290 include first portions 291 having apertures therein for receiving shaft 289 therethrough and an integral elongated portion 292, having a threaded aperture therein threadably receiving a threaded portion 293 of an adjusting screw 294. The free end of each threaded portion 293 includes an enlarged head portion 295 which abuts against the underside or outer periphery of ramp 241 as shown in FIG. 12 (obviously the exact location and the means of engagement of screw 294 with ramp 241 may vary). It can readily be seen that adjustment of screw 294, as shown in FIGS. 12 and 14 indicating two positions thereof, varies the gradually diminishing spacing x between wheel 266 and ramp 241 adjacent the junction of ramp portions 255 and 256 and also pressure on the strips of dough. Also, as shown in FIG. 12, like means for varying this spacing, indicated generally at 287, may be provided at the other end of ramp 241 adjacent the terminal end of ramp portion 257. Like numerals refer to like parts of the means, indicated generally at 287, previously described. The various portions 255 through 257 making up ramp 241 may be of generally resilient material for carrying out the foregoing.

As particularly contemplated within the present invention, moving sidewall means are provided for varying the width of the strips of dough being conveyed through the strip of dough forming and feeding apparatus, indicated generally at 240 and eliminating drag thereon as discussed hereinabove with respect to guide means 170. In the exemplary embodiment, such means, indicated generally at 296, comprises a pair of spaced inner sleeve members 297 rotatably receiving main shaft 271 therethrough and disposed on opposite sides of wheel 266.

A pair of outer sleeve members 298 are slidably mounted on each inner sleeve member 297 and keyed, via keyway 299, to inner sleeve members 297 for non-rotation therewith. That is, outer sleeve members 298 independently rotate with respect to the rotation of main shaft 271.

One or more arms 300 extend radially outwardly from outer sleeve members 298 and carry a ring 301 thereon. Thus, a pair of rings 301 are provided which, as can be seen in FIG. 13, overlap the ends of wheel 266. A pair of gears or sprockets 302 are fixedly secured to each inner sleeve member 297 and spaced from outer sleeve members 298 as shown in FIG. 13. An adjusting screw 303 extends through suitable apertures in both sprockets 302 and inner sleeve members 297. A lock nut 304 retains screw 303 in position with respect to sprocket 302. An adjusting nut 305 retains screw in position with respect to the arm 300 in which it is mounted. An endless chain 306 extends about each sprocket 302 and also about a gear or sprocket 307 (shown in phantom in FIG. 13 and in detail in FIG. 14) mounted on a shaft 308 rotatable in suitable bearing members 309 mounted on top frame member 254 (see FIG. 12).

Before describing further the means, indicated generally at 296, for varying the width of the strips of dough, the drive means for rotating gears or sprockets 307 will be described. Thus, referring both to FIGS. 12 through 14, it can be seen that a suitable motor 310 is mounted on bottom frame member 243 and is operatively connected to a gear reduction assembly 311 which in turn transmits rotation from motor 310 to a shaft 312. Shaft 312 is supported for rotation in one or more suitable bearing members 313 mounted on bottom frame member 243. A pair of spaced gears or sprockets 314 and 315 are mounted on shaft 312 and keyed for rotation therewith. A first endless chain 316 operatively engages sprocket gear or 315 and a gear or sprocket 317 mounted on main shaft 271 and keyed for rotation therewith. Thus, it will be readily appreciated that when motor 310 is activated, chain 316 rotates main shaft 271. The speed of rotation of main shaft 271 is determined by the proper selection of the gears or sprockets described and the gears in the gear reduction assembly 311. Accordingly, the comments set forth hereinabove concerning the preferred rate of rotation of shaft 271 and the various alternatives for effecting this rate of rotation are also deemed pertinent here.

The other gear or sprocket 314 is encircled by an endless chain 318 which is operatively connected to a gear or sprocket 319 mounted on shaft 308 and keyed for rotation therewith. Thus, it can readily be appreciated that when motor 310 is activated, shaft 308 is rotated to also rotate gears or sprockets 307. Since inner sleeve members 207 are keyed for rotation with gears or sprockets 302 operatively connected to gears or sprockets 307 through endless chains 306, sleeve members 297 will rotate thereby rotating rings 301.

Although FIGS. 15 and 18 will be described further hereinbelow, these figures may be referred to, along with FIG. 13, for a proper understanding of the means, indicated generally at 296, for varying the width of strips of dough being formed by the strip of dough forming and feeding appartus, indicated generally at 240.

Thus, it will be appreciated that, when the nuts 305 of adjusting screws 303 are selectively loosened and tightened (FIG. 13), the position of inner sleeve members 297 with respect to gears or sprockets 302 may be varied. This is shown in FIGS. 15 and 18 where the rings 301 are shown overlapping the edges of wheel 266. Thus, adjustment of screw 303 can move rings 301 laterally inwardly and outwardly with respect to the outer periphery 285 of wheel 266 to vary the spacing between the edges 320 of rings 301 thereby moving these edges 320 into abutting engagement with strips of dough carried on the periphery 285 of wheel 266. These edges 320 thus act as moving sidewalls as heretofore described. FIG. 15 shows the widest possible position of rings 301 while FIG. 18 shows the narrowest possible position thereof. Obviously, rings 301 may be set at any intermediate position.

Also, as discussed hereinabove with respect to the embodiment of FIGS. 1 through 5, wheel 266, operatively connected to shaft 271 for rotation therewith, is preferably rotated at twice the speed of rotation as rings 301. That is, the rings 301, integral with arms 300 and sleeve members 297, are rotated as gears or sprockets 302 are rotated. Due to the selection of the proper gears or sprockets and chains, gears or sprockets 302 are rotated at approximately one-half the speed of rotation as wheel 266 for the reasons set forth hereinabove.

As particularly contemplated within the present invention, means are provided for discharging the strips of dough being formed in the strip of dough forming and feeding apparatus, indicated generally at 240, and feeding such strips into the strip of dough transport and feeding apparatus, described hereinabove and indicated generally at 70.

Figure 15:
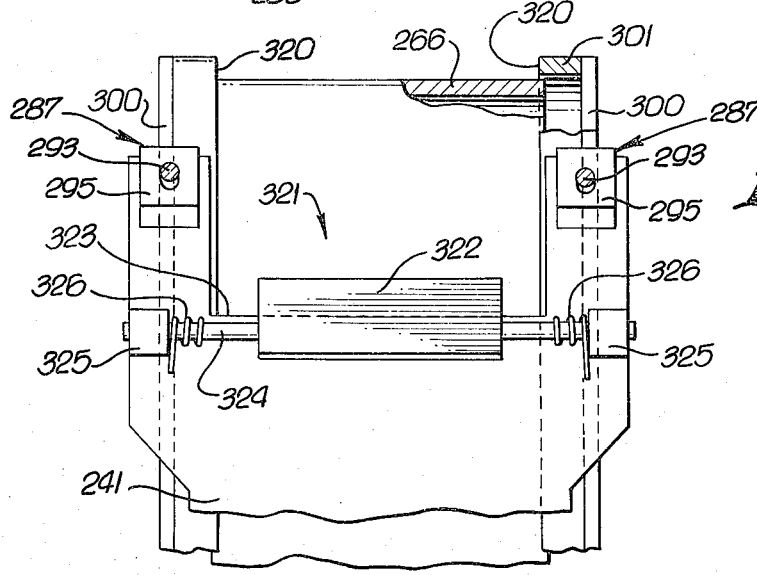
FIG. 15 is a detailed partly sectional view of a portion of the apparatus of FIG. 14 taken along lines XV—XV thereof.

In the exemplary embodiment, such means, indicated generally at 321 and shown particularly in FIGS. 12, 14 and 15, comprises a spring-biased release blade 322 which extends through a slot 323 or the like in ramp 241 and into the path of the strips of dough being formed between wheel 266 and ramp 241 as shown in FIG. 14.

Release blade 322 is shown in detail in FIG. 15 and it can be seen that it is integrally connected to a pin or rod 324 journalled for rotation in suitable bearing members 325 fixedly mounted on upright member 253. Springs 326 encircle rod 324 and are connected thereto and to member 253 to normally bias blade 322 in the FIG. 14 position.

It can be seen in FIG. 14 that a piece or strip of dough 327 is about to engage the end of blade 322 disposed in its path. FIG. 16 shows a strip of dough 328 actually engaging blade 322 and forcing or pivoting blade 322 against the bias of springs 326 to a position whereby the strip of dough 328 bypasses blade 322. When this occurs, blade 322 immediately returns to its FIG. 14 position by virtue of its spring bias where it is once again in a position to be contacted by a subsequent or following strip of dough. As soon as strip of dough 328 bypasses blade 322, and blade 322 returns to its normal FIG. 14 position, the strip of dough (strip 327 in FIG. 14) falls back by gravity onto blade 322 where it rolls down blade 322 to the ramp 52 of the strip of dough transport and feed apparatus, indicated generally at 70, where it is subsequently conveyed to the toroid forming assemblies indicated generally at 10 and discussed in detail hereinabove.

As particularly contemplated within the present invention, quick release means are provided for quickly releasing the means for varying the gradually diminishing spacing between ramp 241 and wheel 266, indicated generally at 287, for cleaning purposes or the like. In the exemplary embodiment, such release means, indicated generally at 329, is shown in phantom in FIG. 13 and comprises an overcentering mechanism 330 fixedly secured to shaft 289 through a linkage 331. A handle 332 is fixedly secured to mechanism 330. A second linkage 333 pivotally connects mechanism 330 to member 252. It will be appreciated that when handle 332 is rotated, it moves shaft 289 overcenter to selectively release head portions 295 from engagement with ramp 241 so that the ramp 241 may be quickly and easily removed for cleaning. Suitable apertures (not shown) may be provided in flanges 288 to carry out the foregoing. It is to be understood that any suitable means, such as one-way clutches or the like, may be used to keep shaft 289 from rotating, then quickly and easily release shaft 289 and thus head portions 295 for releasing ramp 241. Finally, although only one such quick release means, indicated generally at 329, has been illustrated in FIG. 13, it is to be understood that such quick release means may be associated with all of the adjusting screws 294.

The operation of the dough accepting, preforming and feeding apparatus, indicated generally at 240 and illustrated in FIGS. 12 through 16, will now be described as an alternate embodiment of the exemplary embodiment of the invention. As discussed hereinabove, the spacing between the outer periphery 285 of wheel 266 and the inner peripheral surface 286 of ramp 241 may be adjusted to thereby vary the thickness of the strips of dough being formed in apparatus 240. This is accomplished by unlocking handles or rod members 282 and moving them between the FIGS. 12 and 14 positions as discussed hereinabove. Thus, the means for varying the thickness of strips of dough, indicated generally at 248, shifts the axis of wheel 266 and thus varies the spacing x between wheel 266 and the ramp 241 which is stationary.

This spacing x gradually diminishes from a first relatively wide spacing adjacent conveyor 40', then becomes narrower and narrower until the narrowest desired thickness of the strips of dough is reached at the discharge station, indicated generally at 321. This gradually diminishing spacing may be varied by means of adjusting screws 294. Thus, the means for varying this gradually diminishing spacing, indicated generally at 287, may be used to provide for a first relatively wide spacing adjacent conveyor 40' (see FIG. 14), then by adjustment of screws 294 provide for a second relatively narrow spacing adjacent conveyor 40' (see FIG. 12). Of course, this spacing may be varied between these maximum and minimum points and the varying thereof, also varies the spacing between wheel 266 and ramp 241. In this manner, in addition to the desired thickness of the strips of dough being formed, the means 287 may be used to accept any strips from narrow to relatively thick for subsequent forming.

Moving sidewall means are provided for varying the width of the strips of dough, indicated generally at 296, by adjusting the spacing between edges 320 of rings 301 ad discussed hereinabove and shown in FIG. 13 wherein a strip of dough 334 is shown abutting the edges 320 of spaced rings 301. The maximum and minimum spacing of rings 301 is shown in FIGS. 15 and 13, respectively.

It can be seen that the strip of dough forming and feeding apparatus, indicated generally at 240, may be set up to receive batches of dough of varying thicknesses for conveyor 40', and drop these batches onto ramp 241. The spacing relationship between ramp 241 and wheel 266 is preset to form these batches of dough in strips of a desired thickness. At the same time, the desired width of such strips is preset by means or rings 301.

The means for preforming the strips of dough, indicated generally at 347, while conveying them to the dough strip transport and feeding apparatus, indicated generally at 70, will now be described. Thus, motor 310 is activated to rotate wheel 266 in a clockwise direction as shown in FIG. 12. The strips of dough 40" on conveyor 40' are dropped, by gravity, onto the first portion 255 of ramp 241. As wheel 266 rotates, it moves these strips of dough up to the discharge station, i.e., the means for discharging the strips of dough, indicated generally at 321. Since the spacing x between the outer periphery 285 of wheel 266 and the inner peripheral surface 286 diminishes as the strips of dough are moved along wheel 266 and ramp 241, these strips are rolled to the thickness desired. Simultaneously, rings 301 are being rotated at one-half the rate of rotation of wheel 266 and thus also the moving sidewalls or edges 320 move the strips along wheel 266 and ramp 241 while pushing in the ends of such strips to thereby form the desired width thereof.

As these strips of dough reach the means for discharging such strips, indicated generally at 321, blade 322 is flicked out of blocking engagement to release the formed strips of dough back down blade 322 and onto ramp 52. This is shown in FIG. 16 where strip of dough 328 is tripping or flicking blade 322 while FIG.

14 shows the returned position of blade 322 due to its spring bias.

The quick release means, indicated generally at 329, may be used to quickly release the means for varying the gradually diminishing spacing, indicated generally at 287, between ramp 241 and wheel 266. The means for facilitating cleaning ramp 241, indicated generally at 265, may be released to thereby release the two sections of ramp 241 to facilitate cleaning thereof.

Although a specific means has been disclosed in the embodiment of the dough accepting, preforming and feeding apparatus, indicated generally at 240, for discharging strips of dough, indicated generally at 321, from wheel 266 and ramp 241, as illustrated in FIGS. 17 and 18, such means may be varied.

For example, as particularly contemplated within the present invention, alternate means are provided for discharging the strips of dough from wheel 266 and ramp 241. In the alternative embodiment, such means, indicated generally at 335 and illustrated in FIGS. 17 and 18 wherein like numerals refer to like parts of FIGS. 12 through 16, comprises the aforementioned slot 322 in ramp 241. In addition, a gear or sprocket 336 may be keyed for rotation to main shaft 271 (this gear or sprocket 336 is also shown in phantom in FIG. 13). An endless chain 337 extends about both gear or sprocket 336 and a smaller sprocket gear or 338 rotatably mounted on a bracket 339 secured to member 253. A second gear or sprocket 340, generally related in diameter to gear or sprocket 338, is also rotatably mounted on a bracket 341 secured to member 253 and in driven engagement with gear or sprocket 338. Thus, gear or sprocket 341 rotates in a direction opposite to the direction of rotation of wheel 266.

As seen more particularly in FIG. 18, a shaft 342 is fixedly secured to gear or sprocket 341 for rotation therewith. This shaft carries a roller 343, keyed for rotation therewith, which roller 343 is generally the same length as the width of ramp 241. A pair of smaller support rollers 344 may be disposed on either side of roller 343 as shown. The outer peripheral surface 345 of roller 343 may be notched or ribbed as shown to provide a gripping surface for the strips of dough. Of course, the edges 320 of rings 301 and/or periphery of wheel 266, in both this embodiment and that illustrated in FIGS. 12 and 16, may also be provided with a suitable gripping surface. An arcuate member 343a extends from a point generally tangent to ramp 241 over roller 343 and terminates in an upwardly and outwardly extending lip 343b.

It can be seen in FIG. 17 that the distance between the outer periphery 345 of roller 343 and the outer periphery 285 of wheel 266 is generally related to the spacing between the outer periphery 285 of wheel 266 and the inner peripheral surface 286 of ramp 241. That is, as roller 343 is rotated in a counter-clockwise direction, it rotates within slot 322 and thus into abutting engagement with strips of dough, as for example, the strip of dough 346 in FIG. 17, and, because of the peripheral gripping surface 345, picks up these strips of dough and rotates them away from ramp 241 and wheel 266 between roller 343 and member 343a and onto the ramp 52 of the dough strip transport and feeding apparatus, indicated generally at 70 and described heretofore, portions of which are shown in FIG. 17 for convenience of illustration. Lip 343b assists in the removal of the strips of dough from engagement with roller 343.

Thus, in operation, as wheel 266 and rings 301 are rotated as heretofore described, roller 343 engages the strips of dough when these strips reach slot 322 and picks them up and conveys them to ramp 52. The speed of rotation of roller 343 is correlated to the rate of rotation of wheel 266 so that the strips of dough are picked up sequentially as they pass slot 322.

It can be seen from the foregoing that further embodiment of the invention has been disclosed whereby individual batches of dough from a dough divider are preformed into strips of dough, then fed to a receiving station where they are individually conveyed to a feeding station as discussed hereinabove. Further, alternate means have been disclosed for removing the preformed strips of dough from the dough accepting, preforming and feeding apparatus disclosed in the alternate embodiment of the invention.

It will be seen from the foregoing description of the structure and operation of an exemplary embodiment of the present invention that all of the above-mentioned objects are accomplished by the embodiments disclosed herein. Of course, modifications, alterations and variations thereof may be made by persons skilled in the art which come within the scope of the present invention.

I claim:

1. In an apparatus for forming individual batches of pliant material, such as dough from a dough divider into toroids of said dough wherein said apparatus includes strip preforming and feeding means for preforming said batches into individual preformed strips of dough and feeding said preformed strips to strip transport and feed means whereby said preformed strips are received one at a time at a predetermined rate from said strip preforming and feeding means and conveyed individually to toroid forming means where said conveyed strips are formed into toroids of said dough, and drive means associated with both said toroid forming means and said strip transport and feed means for conveying said strips longitudinally to said toroid forming means at a rate coordinated with the rate of operation of said toroid forming means, the improvement which comprises:

means associated with said strip preforming and feeding means for accepting individual batches of said dough from said dough divider at a discharge location;

transport means associated with strip preforming and feeding means for transporting said batches from said discharge location to said strip transport and feed means, said transport means including a conveyor having a generally horizontal surface thereon for receiving said batches of dough;

strip preforming means associated with said transport means for preforming said batches into generally cylindrical strips of dough having a predetermined length and diameter while transporting said batches from said discharge location to said strip transport and feed means, said preforming means including a pressure plate having a generally horizontal surface spaced above the surface of said conveyor;

moving sidewall means associated with at least a portion of said transport means engaging each end of said strips being transported along said transport means for assisting in the transport of said strips therealong and eliminating drag thereon, said moving sidewall means including a pair of spaced conveyor belts disposed on each side of the upper surface of said conveyor remote from said discharge location and adjacent said strip transport and feed means, said belts having surfaces thereon extending generally normal to the surface of said conveyor;

conveyor adjusting means associated with said conveyor belts for adjusting the spacing between the surfaces thereof; and drive means associated with both said moving sidewall means and said transport means for driving both said sidewall means and said transport means in the same direction, said drive means including means associated therewith for moving said conveyor belts at a speed generally about one-half that of the speed of said conveyor.

2. In the apparatus of claim 1 wherein the spacing between the surface of said conveyor and the surface of said plate varies in the direction of movement of said conveyor, the spacing between the surface of said conveyor and the surface of said plate being greater at said discharge location and narrower as said conveyor reaches said strip transport and feed means.

3. In the apparatus of claim 2 including pressure plate adjusting means associated with said pressure plate for adjusting the spacing between said pressure plate and said conveyor.

4. In an apparatus for forming individual batches of pliant material, such as dough from a dough divider into toroids of said dough wherein said apparatus includes strip preforming and feeding means for preforming said batches into individual preformed strips of dough and feeding said preformed strips to strip transport and feed means whereby said preformed strips are received one at a time at a predetermined rate from said strip preforming and feeding means and conveyed individually to toroid forming means where said conveyed strips are formed into toroids of said dough, and drive means associated with both said toroid forming means and said strip transport and feed means for conveying said strips individually to said toroid forming means at a rate coordinated with the rate of operation of said toroid forming means, the improvement which comprises:

means including a generally arcuate ramp associated with said strip preforming and feeding means for accepting individual batches of said dough from said dough divider at a discharge location; transport means including a rotatable wheel associated with said strip preforming and feeding means for transporting said batches from said discharge location to said strip transport and feed means;

strip preforming means associated with said transport means for preforming said batches into generally cylindrical strips of dough having a predetermined length and diameter while transporting said batches from said discharge location to said strip transport and feed means, said strip preforming means including said ramp encircling a substantial portion of said wheel and forming a space between the outer periphery of said wheel and the inner peripheral surface of said ramp for receiving said individual batches of dough between the outer periphery of said wheel and the inner peripheral surface of said ramp whereby said batches of dough are preformed into strips of dough when said wheel is rotated; moving sidewalls means encircling at least a portion of said wheel independent of the rotation of said wheel engaging each end of said strips being transported along said wheel for assisting in the transport of said strips therealong and eliminating drag thereon; and drive means associated with both said moving sidewall means and said wheel for driving both said sidewall means and said wheel in the same direction.

5. In the apparatus of claim 4 including means associated with said wheel for varying the spacing between said wheel and said ramp.

6. In the apparatus of claim 5 wherein said strip preforming means further includes said ramp encircling said wheel forming a spacing between said wheel and said ramp which spacing is relatively wide adjacent said dough divider and diminishes gradually therealong until said strip transport and feed means, and means associated with said ramp for varying the gradually diminishing spacing between said ramp and said wheel and thereby the pressure on the strips of dough being conveyed between said wheel and said ramp.

7. In the apparatus of claim 6 wherein said moving sidewall means engages each end of said strips being conveyed between said wheel and said ramp for assisting in the conveyance of said strips therealong; and said drive means is associated with both said moving sidewall means and said wheel for driving said sidewall means and rotating said wheel in the same direction.

8. In the apparatus of claim 7 wherein said drive means includes means associated therewith for moving said moving sidewall means at a speed generally about one-half the rate of rotation of said wheel.

9. In the apparatus of claim 7 wherein said ramp includes means associated therewith for facilitating removal of said ramp from encirclement of said wheel.

10. In the apparatus of claim 9 wherein said last-mentioned means includes said ramp being comprised of at least two removably interconnected ramp portions.

11. In the apparatus of claim 7 including means associated with said ramp for discharging preformed strips of dough from said strip preforming means and to said strip transport and feed means.

12. In the apparatus of claim 11 wherein said last-mentioned means includes a slot in said ramp adjacent said strip transport and feed means, and a spring-biased blade disposed in the path of the preformed strips of dough being formed between said wheel and said ramp, said blade being movable within said slot from a first position blocking said preformed strips to a second position out of blocking engagement and in operative engagement with said strip transport and feed means when in said second position.

13. In the apparatus of claim 11 wherein said last-mentioned means includes a slot in said ramp adjacent said strip transport and feed means, a roller rotating into the path of the preformed strips of dough being formed between said wheel and said ramp and an arcuate member extending from a point generally tangent to said ramp through said slot and over said roller forming a space therebetween, said roller being rotated in a direction opposite to that of said wheel and having a peripheral surface thereon with means thereof for engaging said preformed strips of dough and conveying them between said arcuate member and said roller to said strip transport and feed means.

14. In the apparatus of claim 7 wherein said means for varying said gradually diminishing spacing further includes means associated therewith for quickly releasing said means for varying said gradually diminishing spacing.

15. In an apparatus for forming individual batches of pliant material, such as dough, into toroids of said dough wherein said apparatus includes a supply conveyor means for forming said batches into individual strips of dough, strips of dough transport and feed means for receiving said strips and conveying said strips to toroid forming means where said conveyed strips are formed into toroids of said dough, rotatable accepting and discharge means associated with said transport and feed means for accepting said strips one at a time from said supply conveyor means at a predetermined rate and discharging said strips one at a time at a discharge location, transport means for transporting individual strips from said discharge location to a feeding station on said toroid forming means, and drive means associated with both said transport and feed means and said toroid forming means for rotating said accepting and discharge means at a rate coordinated with the rate of operation of said toroid forming means, the improvement which comprises:

roller means associated with said transport and feed means for directly engaging said strips discharged from said accepting and discharge means one at a time to said discharge location for rolling said strips along said transport means.

16. In the apparatus of claim 15 wherein said roller means includes an elongated roller of resilient material and further including means associated with both said roller and said drive means for rotating said roller about its longitudinal axis in a direction opposite to the direction of rotation of said accepting and discharge means.

17. In an apparatus for forming individual batches of pliant material, such as dough, into toroids of said dough wherein said apparatus includes a supply conveyor means for forming said batches into individual strips of dough, transport and feed means for receiving said strips and conveying said strips to toroid forming means where said conveyed strips are formed into toroids of said dough, rotatable accepting and discharge means associated with said transport and feed means for accepting said strips one at a time from said supply conveyor means at a predetermined rate and discharging said strips one at a time at a discharge location, transport means for transporting individual strips from said discharge location to a feeding station on said toroid forming means, and drive means associated with both said transport and feed means and said toroid forming means for rotating said accepting and discharge means at a rate coordinated with the rate of operation of said toroid forming means, the improvement which comprises:

strip centering means associated with both said drive means and said feeding station adapted to selectively engage the strip of dough disposed in said feeding station and center said strip in said feeding station prior to forming said strip into a toroid, then disengage from said strip prior to formation of said toroid.

18. In the apparatus of claim 17 wherein said strip centering means includes a pair of abutment members disposed on opposite sides of said feeding station and movable in a direction generally axially aligned with the longitudinal axis of said strip when said strip is disposed in said feeding station to thereby abut against the free ends of said strip when said strip is disposed in said feeding station.

19. In an apparatus for forming individual batches of pliant material, such as dough, into toroids of said dough wherein said appparatus includes a supply conveyor means for forming said batches into individual strips of dough, transport and feed means for receiving said strips and conveying said strips to toroid forming means where said conveyed strips are formed into toroids of said dough, accepting and discharge means associated with said transport and feed means for accepting said strips one at a time from said supply conveyor means at a predetermined rate and discharging said strips one at a time at a discharge location, transport means for transporting individual strips from said discharge location to a feeding station on said toroid forming means, and drive means associated with both said transport and feed means and said toroid forming means for driving said accepting and discharge means at a rate coordinated the rate of operation of said toroid forming means, said toroid forming means including a plurality of forming assemblies, each of said assemblies including a forming sleeve and a mandrel movable axially relative to said sleeve, mounting means for radially mounting said assemblies in a generally vertical plane for concurrent rotation about a generally horizontal axis, means for feeding and positioning successive strips of said pliant material transversely of and in the path of travel of said assemblies to be picked up by and carried along on said assemblies, means for operating each of said forming assemblies to form a picked-up strip into a toroid during rotation of said assembly in said vertical plane, means for releasing each said toroid from its associated forming assembly when said assembly is rotated into an inverted position to drop said toroid away from said inverted assembly in a direction away from said assembly mandrel, each of said sleeves including separable semi-cylindrical sections and said means for releasing each toroid from its associated forming assembly including an elongate member projecting from a free end of the mandrel of said assembly, means for withdrawing said mandrel from within said toroid within the assembly sleeve and for positioning said member within the central opening in said toroid left by said mandrel, means for moving at least one section of said sleeve sections away from said member to release said toroid, said toroid abutting said member to be separated from said one section whenever said toroid tends to adhere to said one section, the improvement which comprises:

the stationary sections of each of said sleeves being outwardly relieved so that a toroid separates therefrom as said toroid is moved axially down said sleeve.

20. In the apparatus of claim 19 further including strip centering means associated with both said drive means and said feeding station adapted to selectively engage the strip of dough disposed in said feeding station and center the strip in said feeding station prior to forming said strip into a toroid, then disengage from said strip prior to formation of said toroid.

21. In the apparatus of claim 20 wherein said strip centering means includes a pair of abutment members disposed on opposite sides of said feeding station and movable in a direction generally axially aligned with the longitudinal axis of said strip when said strip is disposed in said feeding station to thereby abut against the free ends of said strip when said strip is disposed in said feeding station.

* * * * *